US010155274B2

United States Patent
Robinson et al.

(10) Patent No.: US 10,155,274 B2
(45) Date of Patent: Dec. 18, 2018

(54) ATTACHING ELECTRONIC COMPONENTS TO INTERACTIVE TEXTILES

(71) Applicant: Google Inc., Mountain View, CA (US)

(72) Inventors: Karen Elizabeth Robinson, Mountain View, CA (US); Nan-Wei Gong, Cambridge, MA (US); Mustafa Emre Karagozler, Mountain View, CA (US); Ivan Poupyrev, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/586,174

(22) Filed: May 3, 2017

(65) Prior Publication Data
US 2017/0232538 A1    Aug. 17, 2017

Related U.S. Application Data

(62) Division of application No. 14/930,220, filed on Nov. 2, 2015, now Pat. No. 9,693,592.
(Continued)

(51) Int. Cl.
*B23K 1/00* (2006.01)
*B23K 1/20* (2006.01)
(Continued)

(52) U.S. Cl.
CPC ............... *B23K 1/20* (2013.01); *A41D 1/005* (2013.01); *A41D 31/00* (2013.01); *A41D 31/02* (2013.01);
(Continued)

(58) Field of Classification Search
CPC ...... B23K 1/20; B23K 26/362; B23K 26/361; B23K 1/0016; B23K 26/402;
(Continued)

(56) References Cited

U.S. PATENT DOCUMENTS 3,610,874 A    10/1971   Gagliano
3,752,017 A *  8/1973    Lloyd ................ B23K 3/0307
                                                                                   219/221
(Continued)

FOREIGN PATENT DOCUMENTS

CN    202887794    4/2013
CN    103355860    1/2016
(Continued)

OTHER PUBLICATIONS

"Advisory Action", U.S. Appl. No. 14/504,139, dated Aug. 28, 2017, 3 pages.
(Continued)

*Primary Examiner* — Kiley S Stoner
(74) *Attorney, Agent, or Firm* — Colby Nipper

(57) ABSTRACT

This document describes techniques and apparatuses for attaching electronic components to interactive textiles. In various implementations, an interactive textile that includes conductive thread woven into the interactive textile is received. The conductive thread includes a conductive wire (e.g., a copper wire) that that is twisted, braided, or wrapped with one or more flexible threads (e.g., polyester or cotton threads). A fabric stripping process is applied to the interactive textile to strip away fabric of the interactive textile and the flexible threads to expose the conductive wire in a window of the interactive textile. After exposing the conductive wires in the window of the interactive textile, an electronic component (e.g., a flexible circuit board) is attached to the exposed conductive wire of the conductive thread in the window of the interactive textile.

20 Claims, 8 Drawing Sheets

Related U.S. Application Data

(60) Provisional application No. 62/167,168, filed on May 27, 2015.

(51) Int. Cl.

| | | |
|---|---|---|
| *A41D 1/00* | (2018.01) | |
| *B23K 26/362* | (2014.01) | |
| *B23K 26/402* | (2014.01) | |
| *A41D 31/00* | (2006.01) | |
| *D02G 3/44* | (2006.01) | |
| *D02G 3/12* | (2006.01) | |
| *D02G 3/04* | (2006.01) | |
| *G06F 3/044* | (2006.01) | |
| *B23K 26/361* | (2014.01) | |
| *A41D 31/02* | (2006.01) | |
| *B23K 103/00* | (2006.01) | |

(52) U.S. Cl.
CPC .......... *B23K 1/0016* (2013.01); *B23K 26/361* (2015.10); *B23K 26/362* (2013.01); *B23K 26/402* (2013.01); *D02G 3/04* (2013.01); *D02G 3/12* (2013.01); *D02G 3/441* (2013.01); *G06F 3/044* (2013.01); *B23K 2103/38* (2018.08); *B23K 2103/50* (2018.08); *D10B 2101/20* (2013.01); *D10B 2201/01* (2013.01); *D10B 2201/02* (2013.01); *D10B 2211/04* (2013.01); *D10B 2331/04* (2013.01)

(58) Field of Classification Search
CPC ............ B23K 2203/50; B23K 2203/38; A41D 31/02; A41D 1/005; A41D 31/00; G06F 3/044; D02G 3/12; D02G 3/04; D02G 3/441; D10B 2211/04; D10B 2101/20; D10B 2201/02; D10B 2201/01; D10B 2331/04

See application file for complete search history.

(56) References Cited

U.S. PATENT DOCUMENTS

| | | | |
|---|---|---|---|
| 3,953,706 A | 4/1976 | Harris et al. | |
| 4,104,012 A * | 8/1978 | Ferrante | B26D 3/16 425/299 |
| 4,654,967 A | 4/1987 | Thenner | |
| 4,700,044 A | 10/1987 | Hokanson et al. | |
| 4,795,998 A | 1/1989 | Dunbar et al. | |
| 4,838,797 A | 6/1989 | Dodier | |
| 5,016,500 A * | 5/1991 | Conrad | H02G 1/1278 219/233 |
| 5,121,124 A | 6/1992 | Spivey et al. | |
| 5,298,715 A | 3/1994 | Chalco et al. | |
| 5,341,979 A | 8/1994 | Gupta | |
| 5,410,471 A | 4/1995 | Alyfuku et al. | |
| 5,468,917 A | 11/1995 | Brodsky et al. | |
| 5,564,571 A | 10/1996 | Zanotti | |
| 5,656,798 A | 8/1997 | Kubo et al. | |
| 5,724,707 A | 3/1998 | Kirk et al. | |
| 5,798,798 A | 8/1998 | Rector et al. | |
| 6,032,450 A | 3/2000 | Blum | |
| 6,080,690 A | 6/2000 | Lebby et al. | |
| 6,101,431 A | 8/2000 | Niwa et al. | |
| 6,210,771 B1 | 4/2001 | Post et al. | |
| 6,313,825 B1 | 11/2001 | Gilbert | |
| 6,340,979 B1 | 1/2002 | Beaton et al. | |
| 6,386,757 B1 | 5/2002 | Konno | |
| 6,440,593 B2 | 8/2002 | Ellison et al. | |
| 6,492,980 B2 | 12/2002 | Sandbach | |
| 6,493,933 B1 | 12/2002 | Post et al. | |
| 6,513,970 B1 | 2/2003 | Tabata et al. | |
| 6,524,239 B1 | 2/2003 | Reed et al. | |
| 6,543,668 B1 | 4/2003 | Fujii et al. | |
| 6,711,354 B2 | 3/2004 | Kameyama | |
| 6,717,065 B2 | 4/2004 | Hosaka et al. | |
| 6,802,720 B2 | 10/2004 | Weiss et al. | |
| 6,833,807 B2 | 12/2004 | Flacke et al. | |
| 6,835,898 B2 | 12/2004 | Eldridge et al. | |
| 6,854,985 B1 | 2/2005 | Weiss | |
| 6,929,484 B2 | 8/2005 | Weiss et al. | |
| 7,134,879 B2 | 11/2006 | Sugimoto et al. | |
| 7,164,820 B2 | 1/2007 | Eves et al. | |
| 7,223,105 B2 | 5/2007 | Weiss et al. | |
| 7,230,610 B2 * | 6/2007 | Jung | D03D 1/0088 345/156 |
| 7,249,954 B2 | 7/2007 | Weiss | |
| 7,299,964 B2 | 11/2007 | Jayaraman et al. | |
| 7,310,236 B2 | 12/2007 | Takahashi et al. | |
| 7,317,416 B2 | 1/2008 | Flom et al. | |
| 7,348,285 B2 | 3/2008 | Dhawan et al. | |
| 7,365,031 B2 | 4/2008 | Swallow et al. | |
| 7,421,061 B2 | 9/2008 | Boese et al. | |
| 7,462,035 B2 | 12/2008 | Lee et al. | |
| 7,528,082 B2 | 5/2009 | Krans et al. | |
| 7,544,627 B2 | 6/2009 | Tao et al. | |
| 7,578,195 B2 | 8/2009 | DeAngelis et al. | |
| 7,644,488 B2 | 1/2010 | Aisenbrey | |
| 7,670,144 B2 | 3/2010 | Ito et al. | |
| 7,677,729 B2 | 3/2010 | Vilser et al. | |
| 7,691,067 B2 | 4/2010 | Westbrook et al. | |
| 7,698,154 B2 | 4/2010 | Marchosky | |
| 7,791,700 B2 | 9/2010 | Bellamy | |
| 7,834,276 B2 | 11/2010 | Chou et al. | |
| 7,941,676 B2 * | 5/2011 | Glaser | D03D 1/0088 713/300 |
| 7,952,512 B1 | 5/2011 | Delker et al. | |
| 8,062,220 B2 | 11/2011 | Kurtz et al. | |
| 8,169,404 B1 | 5/2012 | Boillot | |
| 8,179,604 B1 | 5/2012 | Prada Gomez et al. | |
| 8,282,232 B2 | 10/2012 | Hsu et al. | |
| 8,289,185 B2 | 10/2012 | Alonso | |
| 8,301,232 B2 | 10/2012 | Albert et al. | |
| 8,334,226 B2 | 12/2012 | Nhan et al. | |
| 8,341,762 B2 | 1/2013 | Balzano | |
| 8,367,942 B2 | 2/2013 | Howell et al. | |
| 8,475,367 B1 | 7/2013 | Yuen et al. | |
| 8,505,474 B2 | 8/2013 | Kang et al. | |
| 8,514,221 B2 | 8/2013 | King et al. | |
| 8,527,146 B1 | 9/2013 | Jackson et al. | |
| 8,549,829 B2 | 10/2013 | Song et al. | |
| 8,560,972 B2 | 10/2013 | Wilson | |
| 8,562,526 B2 | 10/2013 | Heneghan et al. | |
| 8,569,189 B2 | 10/2013 | Bhattacharya et al. | |
| 8,614,689 B2 | 12/2013 | Nishikawa et al. | |
| 8,655,004 B2 | 2/2014 | Prest et al. | |
| 8,700,137 B2 | 4/2014 | Albert | |
| 8,758,020 B2 | 6/2014 | Burdea et al. | |
| 8,759,713 B2 | 6/2014 | Sheats | |
| 8,764,651 B2 | 7/2014 | Tran | |
| 8,785,778 B2 | 7/2014 | Streeter et al. | |
| 8,790,257 B2 | 7/2014 | Libbus et al. | |
| 8,814,574 B2 | 8/2014 | Selby et al. | |
| 8,819,812 B1 | 8/2014 | Weber et al. | |
| 8,921,473 B1 | 12/2014 | Hyman | |
| 8,948,839 B1 | 2/2015 | Longinotti-Buitoni et al. | |
| 9,055,879 B2 | 6/2015 | Selby et al. | |
| 9,093,289 B2 | 7/2015 | Vicard et al. | |
| 9,125,456 B2 | 9/2015 | Chow | |
| 9,141,194 B1 | 9/2015 | Keyes et al. | |
| 9,148,949 B2 * | 9/2015 | Zhou | H05K 1/038 |
| 9,230,160 B1 | 1/2016 | Kanter | |
| 9,331,422 B2 | 5/2016 | Nazzaro et al. | |
| 9,335,825 B2 | 5/2016 | Rautianinen et al. | |
| 9,354,709 B1 | 5/2016 | Heller et al. | |
| 9,569,001 B2 | 2/2017 | Mistry et al. | |
| 9,575,560 B2 | 2/2017 | Poupyrev et al. | |
| 9,588,625 B2 | 3/2017 | Poupyrev | |
| 9,594,443 B2 | 3/2017 | Vanblon et al. | |
| 9,600,080 B2 | 3/2017 | Poupyrev | |
| 9,693,592 B2 | 7/2017 | Robinson et al. | |
| 9,766,742 B2 * | 9/2017 | Papakostas | G06F 3/0416 |
| 9,778,749 B2 | 10/2017 | Poupyrev | |
| 9,811,164 B2 | 11/2017 | Poupyrev | |
| 9,817,109 B2 | 11/2017 | Saboo et al. | |

(56) References Cited

U.S. PATENT DOCUMENTS

| | | |
|---|---|---|
| 9,837,760 B2 | 12/2017 | Karagozler et al. |
| 9,921,660 B2 | 3/2018 | Poupyrev |
| 9,933,908 B2 | 4/2018 | Poupyrev |
| 9,971,414 B2 | 5/2018 | Gollakota et al. |
| 9,971,415 B2 | 5/2018 | Poupyrev et al. |
| 9,983,747 B2 | 5/2018 | Poupyrev |
| 10,082,950 B2 | 9/2018 | Lapp |
| 10,088,908 B1 | 10/2018 | Poupyrev et al. |
| 2001/0035836 A1 | 11/2001 | Miceli et al. |
| 2002/0080156 A1 | 6/2002 | Abbott et al. |
| 2002/0170897 A1 | 11/2002 | Hall |
| 2003/0100228 A1 | 5/2003 | Bungo et al. |
| 2003/0119391 A1 | 6/2003 | Swallow et al. |
| 2004/0009729 A1 | 1/2004 | Hill et al. |
| 2004/0259391 A1 | 12/2004 | Jung et al. |
| 2005/0069695 A1* | 3/2005 | Jung .................. D03D 1/0088 428/328 |
| 2005/0128124 A1 | 6/2005 | Greneker et al. |
| 2005/0148876 A1 | 7/2005 | Endoh et al. |
| 2006/0035554 A1* | 2/2006 | Glaser .................. D02G 3/441 442/301 |
| 2006/0040739 A1 | 2/2006 | Wells |
| 2006/0047386 A1 | 3/2006 | Kanevsky et al. |
| 2006/0061504 A1 | 3/2006 | Leach, Jr. et al. |
| 2006/0125803 A1 | 6/2006 | Westerman et al. |
| 2006/0136997 A1 | 6/2006 | Telek et al. |
| 2006/0148351 A1* | 7/2006 | Tao .................. C23C 14/12 442/110 |
| 2006/0157734 A1 | 7/2006 | Onodera et al. |
| 2006/0166620 A1 | 7/2006 | Sorensen |
| 2006/0170584 A1 | 8/2006 | Romero et al. |
| 2006/0209021 A1 | 9/2006 | Yoo et al. |
| 2006/0258205 A1 | 11/2006 | Locher et al. |
| 2007/0024488 A1 | 2/2007 | Zemany et al. |
| 2007/0026695 A1 | 2/2007 | Lee et al. |
| 2007/0118043 A1 | 5/2007 | Oliver et al. |
| 2007/0161921 A1 | 7/2007 | Rausch |
| 2007/0176821 A1 | 8/2007 | Flom et al. |
| 2007/0192647 A1 | 8/2007 | Glaser |
| 2007/0197115 A1 | 8/2007 | Eves et al. |
| 2007/0197878 A1 | 8/2007 | Shklarski |
| 2007/0210074 A1* | 9/2007 | Maurer ................ B60N 2/5685 219/549 |
| 2007/0237423 A1 | 10/2007 | Tico et al. |
| 2008/0001735 A1 | 1/2008 | Tran |
| 2008/0002027 A1 | 1/2008 | Kondo et al. |
| 2008/0024438 A1 | 1/2008 | Collins et al. |
| 2008/0065291 A1 | 3/2008 | Breed |
| 2008/0134102 A1 | 6/2008 | Movold et al. |
| 2008/0136775 A1 | 6/2008 | Conant |
| 2008/0168396 A1 | 7/2008 | Matas et al. |
| 2008/0211766 A1 | 9/2008 | Westerman et al. |
| 2008/0233822 A1 | 9/2008 | Swallow et al. |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0018408 A1 | 1/2009 | Ouchi et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Toonder |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0295712 A1 | 12/2009 | Ritzau |
| 2009/0319181 A1 | 12/2009 | Khosravy et al. |
| 2010/0050133 A1 | 2/2010 | Nishihara et al. |
| 2010/0053151 A1 | 3/2010 | Marti et al. |
| 2010/0065320 A1 | 3/2010 | Urano |
| 2010/0071205 A1 | 3/2010 | Graumann et al. |
| 2010/0094141 A1 | 4/2010 | Puswella |
| 2010/0201586 A1 | 8/2010 | Michalk |
| 2010/0204550 A1 | 8/2010 | Heneghan et al. |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0281438 A1 | 11/2010 | Latta et al. |
| 2010/0306713 A1 | 12/2010 | Geisner et al. |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0073353 A1 | 3/2011 | Lee et al. |
| 2011/0093820 A1 | 4/2011 | Zhang et al. |
| 2011/0166940 A1 | 7/2011 | Bangera et al. |
| 2011/0181509 A1 | 7/2011 | Rautiainen et al. |
| 2011/0181510 A1 | 7/2011 | Hakala et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0245688 A1 | 10/2011 | Arora et al. |
| 2011/0279303 A1 | 11/2011 | Smith |
| 2011/0286585 A1 | 11/2011 | Hodge |
| 2011/0303341 A1 | 12/2011 | Meiss et al. |
| 2011/0307842 A1 | 12/2011 | Chiang et al. |
| 2011/0318985 A1 | 12/2011 | McDermid |
| 2012/0001875 A1 | 1/2012 | Li et al. |
| 2012/0019168 A1 | 1/2012 | Noda et al. |
| 2012/0047468 A1 | 2/2012 | Santos et al. |
| 2012/0068876 A1 | 3/2012 | Bangera et al. |
| 2012/0092284 A1 | 4/2012 | Rofougaran et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0150493 A1 | 6/2012 | Casey et al. |
| 2012/0154313 A1 | 6/2012 | Au et al. |
| 2012/0156926 A1* | 6/2012 | Kato .................. D03D 3/005 439/502 |
| 2012/0174299 A1 | 7/2012 | Balzano |
| 2012/0174736 A1 | 7/2012 | Wang et al. |
| 2012/0193801 A1 | 8/2012 | Gross et al. |
| 2012/0220835 A1 | 8/2012 | Chung |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0280900 A1 | 11/2012 | Wang et al. |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0046544 A1 | 2/2013 | Kay et al. |
| 2013/0053653 A1 | 2/2013 | Cuddihy et al. |
| 2013/0078624 A1 | 3/2013 | Holmes et al. |
| 2013/0082922 A1 | 4/2013 | Miller |
| 2013/0083173 A1 | 4/2013 | Geisner et al. |
| 2013/0102217 A1* | 4/2013 | Jeon .................. D03D 15/0027 442/182 |
| 2013/0104084 A1 | 4/2013 | Mlyniec et al. |
| 2013/0113830 A1 | 5/2013 | Suzuki |
| 2013/0117377 A1 | 5/2013 | Miller |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0161078 A1 | 6/2013 | Li |
| 2013/0169471 A1 | 7/2013 | Lynch |
| 2013/0194173 A1 | 8/2013 | Zhu et al. |
| 2013/0195330 A1 | 8/2013 | Kim et al. |
| 2013/0196716 A1 | 8/2013 | Muhammad |
| 2013/0207962 A1 | 8/2013 | Oberdorfer et al. |

(56) References Cited

U.S. PATENT DOCUMENTS

| | | |
|---|---|---|
| 2013/0253029 A1 | 9/2013 | Jain et al. |
| 2013/0260630 A1 | 10/2013 | Ito et al. |
| 2013/0278499 A1 | 10/2013 | Anderson |
| 2013/0278501 A1 | 10/2013 | Bulzacki |
| 2013/0283203 A1 | 10/2013 | Batraski et al. |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0049487 A1 | 2/2014 | Konertz et al. |
| 2014/0050354 A1 | 2/2014 | Heim et al. |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139616 A1 | 5/2014 | Pinter et al. |
| 2014/0143678 A1 | 5/2014 | Mistry et al. |
| 2014/0184496 A1 | 7/2014 | Gribetz et al. |
| 2014/0184499 A1 | 7/2014 | Kim |
| 2014/0191939 A1 | 7/2014 | Penn et al. |
| 2014/0200416 A1 | 7/2014 | Kashef et al. |
| 2014/0201690 A1 | 7/2014 | Holz |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0275854 A1 | 9/2014 | Venkatraman et al. |
| 2014/0280295 A1 | 9/2014 | Kurochikin et al. |
| 2014/0281975 A1 | 9/2014 | Anderson |
| 2014/0282877 A1 | 9/2014 | Mahaffey et al. |
| 2014/0297006 A1 | 10/2014 | Sadhu |
| 2014/0298266 A1 | 10/2014 | Lapp |
| 2014/0306936 A1 | 10/2014 | Dahl et al. |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368441 A1 | 12/2014 | Touloumtzis |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0046183 A1 | 2/2015 | Cireddu |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0091903 A1 | 4/2015 | Costello et al. |
| 2015/0099941 A1 | 4/2015 | Tran |
| 2015/0100328 A1 | 4/2015 | Kress et al. |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177866 A1 | 6/2015 | Hwang et al. |
| 2015/0185314 A1 | 7/2015 | Corcos et al. |
| 2015/0199045 A1 | 7/2015 | Robucci et al. |
| 2015/0226004 A1 | 8/2015 | Thompson |
| 2015/0256763 A1 | 9/2015 | Niemi |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1 | 10/2015 | Sprenger et al. |
| 2015/0280102 A1 | 10/2015 | Tajitsu et al. |
| 2015/0287187 A1 | 10/2015 | Redtel |
| 2015/0312041 A1 | 10/2015 | Choi |
| 2015/0317518 A1 | 11/2015 | Fujimaki et al. |
| 2015/0323993 A1 | 11/2015 | Levesque et al. |
| 2015/0332075 A1 | 11/2015 | Burch |
| 2015/0341550 A1 | 11/2015 | Lay |
| 2015/0346820 A1 | 12/2015 | Poupyrev et al. |
| 2015/0351703 A1 | 12/2015 | Phillips et al. |
| 2015/0375339 A1 | 12/2015 | Sterling et al. |
| 2016/0018948 A1 | 1/2016 | Parvarandeh et al. |
| 2016/0026253 A1 | 1/2016 | Bradski et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0042169 A1 | 2/2016 | Polehn |
| 2016/0048235 A1 | 2/2016 | Poupyrev |
| 2016/0048236 A1 | 2/2016 | Poupyrev |
| 2016/0048672 A1 | 2/2016 | Lux et al. |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0090839 A1 | 3/2016 | Stolarcyzk |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0145776 A1 | 5/2016 | Roh |
| 2016/0170491 A1 | 6/2016 | Jung |
| 2016/0171293 A1 | 6/2016 | Li et al. |
| 2016/0186366 A1 | 6/2016 | McMaster |
| 2016/0206244 A1 | 7/2016 | Rogers |
| 2016/0213331 A1 | 7/2016 | Gil et al. |
| 2016/0216825 A1 | 7/2016 | Forutanpour |
| 2016/0249698 A1 | 9/2016 | Berzowska et al. |
| 2016/0252965 A1 | 9/2016 | Mandella et al. |
| 2016/0253044 A1 | 9/2016 | Katz |
| 2016/0259037 A1 | 9/2016 | Molchanov et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0299526 A1 | 10/2016 | Inagaki et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | DeBusschere et al. |
| 2016/0345638 A1* | 12/2016 | Robinson ............ A41D 1/005 |
| 2016/0349790 A1 | 12/2016 | Connor |
| 2016/0349845 A1 | 12/2016 | Poupyrev et al. |
| 2016/0377712 A1 | 12/2016 | Wu et al. |
| 2017/0052618 A1 | 2/2017 | Lee et al. |
| 2017/0060254 A1 | 3/2017 | Molchanov et al. |
| 2017/0060298 A1 | 3/2017 | Hwang et al. |
| 2017/0075481 A1 | 3/2017 | Chou et al. |
| 2017/0075496 A1 | 3/2017 | Rosenberg et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0125940 A1 | 5/2017 | Karagozler et al. |
| 2017/0192523 A1 | 7/2017 | Poupyrev |
| 2017/0196513 A1 | 7/2017 | Longinotti-Buitoni et al. |
| 2017/0233903 A1* | 8/2017 | Jeon .................... D03D 1/0088 |
| | | 139/425 R |
| 2017/0249033 A1 | 8/2017 | Podhajny et al. |
| 2017/0322633 A1 | 11/2017 | Shen et al. |
| 2017/0325337 A1 | 11/2017 | Karagozler et al. |
| 2017/0325518 A1 | 11/2017 | Poupyrev et al. |
| 2017/0329425 A1 | 11/2017 | Karagozler et al. |

(56) References Cited

U.S. PATENT DOCUMENTS

| | | | |
|---|---|---|---|
| 2018/0004301 | A1 | 1/2018 | Poupyrev |
| 2018/0005766 | A1* | 1/2018 | Fairbanks ............ H01G 9/2095 |
| 2018/0046258 | A1 | 2/2018 | Poupyrev |
| 2018/0157330 | A1 | 6/2018 | Gu et al. |
| 2018/0160943 | A1 | 6/2018 | Fyfe et al. |
| 2018/0196527 | A1 | 7/2018 | Poupyrev et al. |

FOREIGN PATENT DOCUMENTS

| | | |
|---|---|---|
| DE | 102011075725 | 11/2012 |
| DE | 102013201359 | 7/2014 |
| EP | 0161895 | 11/1985 |
| EP | 1815788 | 8/2007 |
| FR | 3017722 | 8/2015 |
| GB | 2070469 | 9/1981 |
| GB | 2443208 | 4/2008 |
| JP | 2003280049 | 10/2003 |
| JP | 2006234716 | 9/2006 |
| JP | 2011102457 | 5/2011 |
| WO | WO-9001895 | 3/1990 |
| WO | WO-0130123 | 4/2001 |
| WO | WO-2001027855 | 4/2001 |
| WO | WO-0175778 | 10/2001 |
| WO | WO-2002082999 | 10/2002 |
| WO | WO-2005033387 | 4/2005 |
| WO | 2007125298 | 11/2007 |
| WO | WO-2008061385 | 5/2008 |
| WO | WO-2009032073 | 3/2009 |
| WO | 2009083467 | 7/2009 |
| WO | WO-2010032173 | 3/2010 |
| WO | WO-2012026013 | 3/2012 |
| WO | WO-2012152476 | 11/2012 |
| WO | WO-2013082806 | 6/2013 |
| WO | WO-2013084108 | 6/2013 |
| WO | WO-2013186696 | 12/2013 |
| WO | WO-2013191657 | 12/2013 |
| WO | WO-2013192166 | 12/2013 |
| WO | WO-2014019085 | 2/2014 |
| WO | WO-2014116968 | 7/2014 |
| WO | WO-2014124520 | 8/2014 |
| WO | WO-2014136027 | 9/2014 |
| WO | WO-2014138280 | 9/2014 |
| WO | WO-2014160893 | 10/2014 |
| WO | WO-2014165476 | 10/2014 |
| WO | WO-2014204323 | 12/2014 |
| WO | WO-2015017931 | 2/2015 |
| WO | WO-2015022671 | 2/2015 |
| WO | 2016053624 | 4/2016 |
| WO | 2016154560 | 9/2016 |
| WO | 2016154568 | 9/2016 |
| WO | 20170200949 | 11/2017 |
| WO | 2018106306 | 6/2018 |

OTHER PUBLICATIONS

"Final Office Action", U.S. Appl. No. 15/398,147, dated Jun. 30, 2017, 11 pages.
"Final Office Action", U.S. Appl. No. 14/874,955, dated Jun. 30, 2017, 9 pages.
"Final Office Action", U.S. Appl. No. 14/504,121, dated Aug. 8, 2017, 16 pages.
"Final Office Action", U.S. Appl. No. 14/959,901, dated Aug. 25, 2017, 19 pages.
"Non-Final Office Action", U.S. Appl. No. 14/862,409, dated Jun. 22, 2017, 15 pages.
"Non-Final Office Action", U.S. Appl. No. 14/959,730, dated Jun. 23, 2017, 14 pages.
"Non-Final Office Action", U.S. Appl. No. 15/093,533, dated Aug. 24, 2017, 18 pages.
"Non-Final Office Action", U.S. Appl. No. 15/142,619, dated Aug. 25, 2017, 16 pages.
"Non-Final Office Action", U.S. Appl. No. 14/959,799, dated Sep. 8, 2017, 16 pages.
"Non-Final Office Action", U.S. Appl. No. 15/398,147, dated Sep. 8, 2017, 7 pages.
"Notice of Allowance", U.S. Appl. No. 14/513,875, dated Jun. 28, 2017, 7 pages.
"Notice of Allowance", U.S. Appl. No. 14/504,038, dated Aug. 7, 2017, 17 pages.
"Pre-Interview Office Action", U.S. Appl. No. 14/862,409, dated Sep. 15, 2017, 16 pages.
"Cardiio", Retrieved From: <http://www.cardiio.com/> Apr. 15, 2015 App Information Retrieved From: <https://itunes.apple.com/us/app/cardiio-touchless-camera-pulse/id542891434?Is=1&mt=8> Apr. 15, 2015, Feb. 24, 2015, 6 pages.
"Combined Search and Examination Report", GB Application No. 1620892.8, dated Apr. 6, 2017, 5 pages.
"Corrected Notice of Allowance", U.S. Appl. No. 14/312,486, dated Jan. 23, 2017, 4 pages.
"Corrected Notice of Allowance", U.S. Appl. No. 14/312,486, dated Oct. 28, 2016, 4 pages.
"Corrected Notice of Allowance", U.S. Appl. No. 14/504,061, dated Dec. 27, 2016, 2 pages.
"Corrected Notice of Allowance", U.S. Appl. No. 14/582,896, dated Feb. 6, 2017, 2 pages.
"Corrected Notice of Allowance", U.S. Appl. No. 14/582,896, dated Feb. 23, 2017, 2 pages.
"Corrected Notice of Allowance", U.S. Appl. No. 14/582,896, dated Dec. 19, 2016, 2 pages.
"Corrected Notice of Allowance", U.S. Appl. No. 14/930,220, dated Mar. 20, 2017, 2 pages.
"Extended European Search Report", EP Application No. 15170577.9, dated Nov. 5, 2015, 12 pages.
"Final Office Action", U.S. Appl. No. 14/312,486, dated Jun. 3, 2016, 32 pages.
"Final Office Action", U.S. Appl. No. 14/504,038, dated Sep. 27, 2016, 23 pages.
"Final Office Action", U.S. Appl. No. 14/504,061, dated Mar. 9, 2016, 10 pages.
"Final Office Action", U.S. Appl. No. 14/599,954, dated Aug. 10, 2016, 23 pages.
"Final Office Action", U.S. Appl. No. 14/681,625, dated Dec. 7, 2016, 10 pages.
"First Action Interview Office Action", U.S. Appl. No. 14/959,901, dated Apr. 14, 2017, 3 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"International Preliminary Report on Patentability", Application No. PCT/US2015/043963, dated Feb. 16, 2017, 12 pages.
"International Preliminary Report on Patentability", Application No. PCT/US2015/030388, dated Dec. 15, 2016, 12 pages.
"International Preliminary Report on Patentability", Application No. PCT/US2015/043949, dated Feb. 16, 2017, 13 pages.
"International Preliminary Report on Patentability", Application No. PCT/US2015/044774, dated Mar. 2, 2017, 8 pages.
"International Search Report and Written Opinion", Application No. PCT/US2016/060399, dated Jan. 30, 2017, 11 pages.
"International Search Report and Written Opinion", Application No. PCT/US2016/062082, dated Feb. 23, 2017, 12 pages.
"International Search Report and Written Opinion", Application No. PCT/US2016/042013, dated Oct. 26, 2016, 12 pages.
"International Search Report and Written Opinion", Application No. PCT/US2015/044774, dated Nov. 3, 2015, 12 pages.
"International Search Report and Written Opinion", Application No. PCT/US2016/024267, dated Jun. 20, 2016, 13 pages.
"International Search Report and Written Opinion", Application No. PCT/US2016/024273, dated Jun. 20, 2016, 13 pages.
"International Search Report and Written Opinion", Application No. PCT/US2016/032307, dated Aug. 25, 2016, 13 pages.
"International Search Report and Written Opinion", Application No. PCT/US2016/034366, dated Nov. 17, 2016, 13 pages.
"International Search Report and Written Opinion", Application No. PCT/US2016/029820, dated Jul. 15, 2016, 14 pages.
"International Search Report and Written Opinion", Application No. PCT/US2016/055671, dated Dec. 1, 2016, 14 pages.

(56) References Cited

OTHER PUBLICATIONS

"International Search Report and Written Opinion", Application No. PCT/US2016/030177, dated Aug. 2, 2016, 15 pages.
"International Search Report and Written Opinion", Application No. PCT/US2015/043963, dated Nov. 24, 2015, 16 pages.
"International Search Report and Written Opinion", Application No. PCT/US2016/024289, dated Aug. 25, 2016, 17 pages.
"International Search Report and Written Opinion", Application No. PCT/US2015/050903, dated Feb. 19, 2016, 18 pages.
"International Search Report and Written Opinion", Application No. PCT/US2016/030115, dated Aug. 8, 2016, 18 pages.
"International Search Report and Written Opinion", Application No. PCT/US2015/043949, dated Dec. 1, 2015, 18 pages.
"International Search Report and Written Opinion", Application No. PCT/US2016/033342, dated Oct. 27, 2016, 20 pages.
"Life:X Lifestyle eXplorer", Retrieved from <https://web.archive.org/web/20150318093841/http://research.microsoft.com/en-us/projects/lifex >, Feb. 3, 2017, 2 pages.
"Non-Final Office Action", U.S. Appl. No. 14/312,486, dated Oct. 23, 2015, 25 pages.
"Non-Final Office Action", U.S. Appl. No. 14/504,038, dated Feb. 26, 2016, 22 pages.
"Non-Final Office Action", U.S. Appl. No. 14/504,038, dated Mar. 22, 2017, 33 pages.
"Non-Final Office Action", U.S. Appl. No. 14/504,061, dated Nov. 4, 2015, 8 pages.
"Non-Final Office Action", U.S. Appl. No. 14/504,121, dated Jan. 9, 2017, 13 pages.
"Non-Final Office Action", U.S. Appl. No. 14/504,139, dated Jan. 27, 2017, 10 pages.
"Non-Final Office Action", U.S. Appl. No. 14/513,875, dated Feb. 21, 2017, 9 pages.
"Non-Final Office Action", U.S. Appl. No. 14/518,863, dated Oct. 14, 2016, 16 pages.
"Non-Final Office Action", U.S. Appl. No. 14/582,896, dated Jun. 29, 2016, 9 pages.
"Non-Final Office Action", U.S. Appl. No. 14/599,954, dated Jan. 26, 2017, 16 pages.
"Non-Final Office Action", U.S. Appl. No. 14/599,954, dated Feb. 2, 2016, 17 pages.
"Non-Final Office Action", U.S. Appl. No. 14/666,155, dated Feb. 3, 2017, 12 pages.
"Non-Final Office Action", U.S. Appl. No. 14/666,155, dated Aug. 24, 2016, 9 pages.
"Non-Final Office Action", U.S. Appl. No. 14/681,625, dated Mar. 6, 2017, 7 pages.
"Non-Final Office Action", U.S. Appl. No. 14/681,625, dated Aug. 12, 2016, 9 pages.
"Non-Final Office Action", U.S. Appl. No. 14/874,955, dated Feb. 27, 2017, 8 pages.
"Non-Final Office Action", U.S. Appl. No. 14/930,220, dated Sep. 14, 2016, 15 pages.
"Non-Final Office Action", U.S. Appl. No. 14/959,799, dated Jan. 27, 2017, 10 pages.
"Non-Final Office Action", U.S. Appl. No. 15/398,147, dated Mar. 9, 2017, 10 pages.
"Notice of Allowance", U.S. Appl. No. 14/312,486, dated Oct. 7, 2016, 15 pages.
"Notice of Allowance", U.S. Appl. No. 14/504,061, dated Sep. 12, 2016, 7 pages.
"Notice of Allowance", U.S. Appl. No. 14/582,896, dated Nov. 7, 2016, 5 pages.
"Notice of Allowance", U.S. Appl. No. 14/930,220, dated Feb. 2, 2017, 8 pages.
"Philips Vital Signs Camera", Retrieved From: <http://www.vitalsignscamera.com/> Apr. 15, 2015, Jul. 17, 2013, 2 pages.
"Pre-Interview Communication", U.S. Appl. No. 14/494,863, dated Jan. 27, 2017, 5 pages.
"Pre-Interview Communication", U.S. Appl. No. 14/513,875, dated Oct. 21, 2016, 3 pages.
"Pre-Interview Communication", U.S. Appl. No. 14/715,454, dated Apr. 14, 2017, 3 pages.
"Pre-Interview Communication", U.S. Appl. No. 14/715,793, dated Mar. 20, 2017, 3 pages.
"Pre-Interview Communication", U.S. Appl. No. 14/959,730, dated Feb. 15, 2017, 3 pages.
"Pre-Interview Communication", Application No. 14/959,901, dated Feb. 10, 2017, 3 pages.
"Pre-Interview Communication", U.S. Appl. No. 15/343,067, dated Apr. 19, 2017, 3 pages.
"Restriction Requirement", U.S. Appl. No. 14/666,155, dated Jul. 22, 2016, 5 pages.
"Textile Wire Brochure", Retrieved at: http://www.textile-wire.ch/en/home.html, Aug. 7, 2004, 17 pages.
"The Dash smart earbuds play back music, and monitor your workout", Retrieved from < http://newatlas.com/bragi-dash-tracking-earbuds/30808/>, Feb. 13, 2014, 3 pages.
"The Instant Blood Pressure app estimates blood pressure with your smartphone and our algorithm", Retrieved at: http://www.instantbloodpressure.com/—on Jun. 23, 2016, 6 pages.
Arbabian,"A 94GHz mm-Wave to Baseband Pulsed-Radar for Imaging and Gesture Recognition", 2012 IEEE, 2012 Symposium on VLSI Circuits Digest of Technical Papers, 2012, 2 pages.
Balakrishnan,"Detecting Pulse from Head Motions in Video", In Proceedings: CVPR '13.
Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.
Cheng,"Smart Textiles: From Niche to Mainstream", IEEE Pervasive Computing, Jul. 2013, pp. 81-84.
Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.
Espina,"Wireless Body Sensor Network for Continuous Cuff-less Blood Pressure Monitoring", International Summer School on Medical Devices and Biosensors, 2006, Sep. 2006, 5 pages.
Farringdon,"Wearable Sensor Badge & Sensor Jacket for Context Awareness", Third International Symposium on Wearable Computers, Oct. 1999, 7 pages.
Godana,"Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
He,"A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, Feb. 2013, 137 pages.
Holleis,"Evaluating Capacitive Touch Input on Clothes", Proceedings of the 10th International Conference on Human Computer Interaction, Jan. 1, 2008, 10 pages.
Klabunde,"Ventricular Pressure-Volume Loop Changes in Valve Disease", Retrieved From <https://web.archive.org/web/20101201185256/http://cvphysiology.com/Heart%20Disease/HD009.htm>, Dec. 1, 2010, 8 pages.
Matthews,"Venous Pulse", Retrieved at: http://www.rjmatthewsmd.com/Definitions/venous_pulse.htm—on Nov. 30, 2016, Apr. 13, 2013, 7 pages.
Nakajima,"Development of Real-Time Image Sequence Analysis for Evaluating Posture Change and Respiratory Rate of a Subject in Bed", In Proceedings: Physiological Measurement, vol. 22, No. 3. Retrieved From: <http://iopscience.iop.org/0967-3334/22/3/401/pdf/0967-3334_22_3_401.pdf> Feb. 27, 2015, Aug. 2001, 8 pages.
Palese,"The Effects of Earphones and Music on the Temperature Measured by Infrared Tympanic Thermometer: Preliminary Results", ORL—head and neck nursing: official journal of the Society of Otorhinolaryngology and Head-Neck Nurses 32.2, 2013, pp. 8-12.
Patel,"Applications of Electrically Conductive Yarns in Technical Textiles", International Conference on Power System Technology (POWECON), Oct. 30, 2012, 6 pages.

(56) References Cited

OTHER PUBLICATIONS

Poh,"A Medical Mirror for Non-contact Health Monitoring", In Proceedings: ACM SIGGRAPH Emerging Technologies Available at: <http://affect.media.mit.edu/pdfs/11.Poh-etal-SIGGRAPH.pdf>, 2011, 1 page.

Poh,"Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378C02%5F199381%2Foe%2D18%2D10%2D10762%2Ep, May 7, 2010, 13 pages.

Pu,"Gesture Recognition Using Wireless Signals", Oct. 2014, pp. 15-18.

Pu,"Whole-Home Gesture Recognition Using Wireless Signals", MobiCom '13 Proceedings of the 19th annual international conference on Mobile computing & networking, Aug. 27, 2013, 12 pages.

Schneegass,"Towards a Garment OS: Supporting Application Development for Smart Garments", Wearable Computers, ACM, Sep. 2014, 6 pages.

Stoppa,"Wearable Electronics and Smart Textiles: A Critical Review", In Proceedings of Sensors, vol. 14, Issue 7, Jul. 7, 2014, pp. 11957-11992.

Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.

Wang,"Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.

Wijesiriwardana,"Capacitive Fibre-Meshed Transducer for Touch & Proximity Sensing Applications", IEEE Sensors Journal, IEEE Service Center, Oct. 1, 2005, 5 pages.

Zhadobov, "Millimeter-wave Interactions with the Human Body: State of Knowledge and Recent Advances", International Journal of Microwave and Wireless Technologies, Mar. 1, 2011, 11 pages.

Zhang,"Study of the Structural Design and Capacitance Characteristics of Fabric Sensor", Advanced Materials Research (vols. 194-196), Feb. 21, 2011, 8 pages.

"Combined Search and Examination Report", GB Application No. 1620891.0, dated May 31, 2017, 9 pages.

"Corrected Notice of Allowance", U.S. Appl. No. 14/930,220, dated May 11, 2017, 2 pages.

"Final Office Action", U.S. Appl. No. 14/959,799, dated Jul. 19, 2017, 12 pages.

"Final Office Action", U.S. Appl. No. 14/518,863, dated May 5, 2017, 18 pages.

"International Preliminary Report on Patentability", Application No. PCT/US2015/050903, dated Apr. 13, 2017, 12 pages.

"International Search Report and Written Opinion", Application No. PCT/US2016/063874, dated May 11, 2017, 19 pages.

"Non-Final Office Action", U.S. Appl. No. 15/403,066, dated May 4, 2017, 31 pages.

"Notice of Allowance", U.S. Appl. No. 15/343,067, dated Jul. 27, 2017, 9 pages.

"Notice of Allowance", U.S. Appl. No. 14/494,863, dated May 30, 2017, 7 pages.

"Final Office Action", U.S. Appl. No. 14/959,799, dated Jan. 4, 2018, 17 pages.

"Final Office Action", U.S. Appl. No. 15/142,619, dated Feb. 8, 2018, 15 pages.

"International Search Report and Written Opinion", PCT/US2017/047691, dated Nov. 16, 2017, 13 pages.

"International Search Report and Written Opinion", PCT Application No. PCT/US2017/051663, dated Nov. 29, 2017, 16 pages.

"Non-Final Office Action", U.S. Appl. No. 14/504,121, dated Jan. 2, 2018, 19 pages.

"Non-Final Office Action", U.S. Appl. No. 14/959,901, dated Jan. 8, 2018, 21 pages.

"Non-Final Office Action", U.S. Appl. No. 14/862,409, dated Dec. 14, 2017, 17 pages.

"Non-Final Office Action", U.S. Appl. No. 15/267,181, dated Feb. 8, 2018, 29 pages.

"Non-Final Office Action", U.S. Appl. No. 14/874,955, dated Feb. 8, 2018, 7 pages.

"Notice of Allowance", U.S. Appl. No. 15/403,066, dated Jan. 8, 2018, 18 pages.

"Pre-Interview First Office Action", U.S. Appl. No. 15/286,152, dated Feb. 8, 2018, 4 pages.

"Preliminary Report on Patentability", PCT Application No. PCT/US2016/034366, dated Dec. 7, 2017, 10 pages.

"Restriction Requirement", U.S. Appl. No. 15/362,359, dated Jan. 8, 2018, 5 pages.

Bondade, et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873. DOI: 10.1109/ECCE.2014.6954193, Sep. 14, 2014, 5 pages.

Fan, et al., "Wireless Hand Gesture Recognition Based on Continuous-Wave Doppler Radar Sensors", IEEE Transactions on Microwave Theory and Techniques, Plenum, USA, vol. 64, No. 11, Nov. 1, 2016 (Nov. 1, 2016), pp. 4012-4012, XP011633246, ISSN: 0018-9480, DOI: 10.1109/TMTT.2016.2610427, Nov. 1, 2016, 9 pages.

Lien, et al., "Soli: Ubiquitous Gesture Sensing with Millimeter Wave Radar", ACM Transactions on Graphics (TOG), ACM, US, vol. 35, No. 4, Jul. 11, 2016 (Jul. 11, 2016), pp. 1-19. XP058275791, ISSN: 0730-0301, DOI: 10.1145/2897824.2925953, Jul. 11, 2016, 19 pages.

Martinez-Garcia, et al., "Flour-quadrant linear-assisted DC/DC voltage regulator", Analog Integrated Circuits and Signal Processing, Springer New York LLC, US. vol. 88, No. 1, Apr. 23, 2016 (Apr. 23, 2016) , pp. 151-160, XP035898949, ISSN: 0925-1030, DOI: 10.1007/S10470-016-0747-8, Apr. 23, 2016, 10 pages.

Skolnik,"CW and Frequency-Modulated Radar", In: "Introduction To Radar Systems", Jan. 1, 1981 (Jan. 1, 1981), McGraw Hill, XP055047545, ISBN: 978-0-07-057909-5 pp. 68-100, p. 95-p. 97. Jan. 1, 1981, 18 pages.

Zheng, et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, Dec. 9, 2013 (Dec. 9, 2013), p. 3, XP032574214, DOI: 10.1109/IMWS-BIO.2013.6756200, Dec. 9, 2013, 3 Pages.

"Final Office Action", U.S. Appl. No. 15/403,066, dated Oct. 5, 2017, 31 pages.

"Final Office Action", U.S. Appl. No. 14/959,730, dated Nov. 22, 2017, 16 pages.

"Non-Final Office Action", U.S. Appl. No. 14/518,863, dated Sep. 29, 2017, 20 pages.

"Non-Final Office Action", U.S. Appl. No. 15/142,689, dated Oct. 4, 2017, 18 pages.

"Non-Final Office Action", U.S. Appl. No. 14/504,139, dated Oct. 18, 2017, 12 pages.

"Non-Final Office Action", U.S. Appl. No. 15/595,649, dated Oct. 31, 2017, 16 pages.

"Notice of Allowance", U.S. Appl. No. 14/874,955, dated Oct. 20, 2017, 7 pages.

"Notice of Allowance", U.S. Appl. No. 15/398,147, dated Nov. 15, 2017, 8 pages.

"Written Opinion", PCT Application No. PCT/US2017/032733, dated Jul. 26, 2017, 5 pages.

"Final Office Action", U.S. Appl. No. 15/093,533, dated Mar. 21, 2018, 19 pages.

"Final Office Action", U.S. Appl. No. 14/518,863, dated Apr. 5, 2018, 21 pages.

"Final Office Action", U.S. Appl. No. 14/504,139, dated May 1, 2018, 14 pages.

"First Action Interview Office Action", U.S. Appl. No. 15/286,152, dated May 1, 2018, 5 pages.

"First Action Interview Office Action", U.S. Appl. No. 15/166,198, dated Apr. 25, 2018, 8 pages.

(56) References Cited

OTHER PUBLICATIONS

"Foreign Office Action", Chinese Application No. 201721290290.3, dated Mar. 9, 2018, 2 pages.
"Non-Final Office Action", U.S. Appl. No. 15/287,253, dated Apr. 5, 2018, 17 pages.
"Notice of Allowance", U.S. Appl. No. 14/959,730, dated Feb. 22, 2018, 8 pages.
"Pre-Interview Communication", U.S. Appl. No. 15/166,198, dated Mar. 8, 2018, 8 pages.
"Pre-Interview Communication", U.S. Appl. No. 15/362,359, dated May 17, 2018, 4 pages.
"Written Opinion", PCT Application No. PCT/US2017/032733, dated Jul. 24, 2017, 5 pages.
"Final Office Action", U.S. Appl. No. 15/595,649, dated May 23, 2018, 13 pages.
"Final Office Action", U.S. Appl. No. 15/142,689, dated Jun. 1, 2018, 16 pages.
"Final Office Action", U.S. Appl. No. 14/874,955, dated Jun. 11, 2018, 9 pages.
"Final Office Action", U.S. Appl. No. 14/959,901, dated Jun. 15, 2018, 21 pages.
"Final Office Action", U.S. Appl. No. 15/286,152, dated Jun. 26, 2018, 25 pages.
"Final Office Action", U.S. Appl. No. 15/267,181, dated Jun. 7, 2018, 31 pages.
"Final Office Action", U.S. Appl. No. 14/504,121, dated Jul. 9, 2018, 23 pages.
"Foreign Office Action", Chinese Application No. 201721290290.3, dated Jun. 6, 2018, 3 pages.
"Non-Final Office Action", U.S. Appl. No. 15/286,512, dated Jul. 19, 2018, 15 pages.
"Notice of Allowance", U.S. Appl. No. 15/362,359, dated Aug. 3, 2018, 8 pages.
"Notice of Allowance", U.S. Appl. No. 14/862,409, dated Jun. 6, 2018, 7 pages.
"Notice of Allowance", U.S. Appl. No. 15/142,619, dated Aug. 13, 2018, 9 pages.
"Pre-Interview Communication", U.S. Appl. No. 15/287,359, dated Jul. 24, 2018, 2 pages.
"Corrected Notice of Allowance", U.S. Appl. No. 15/362,359, dated Sep. 17, 2018, 10 pages.
"Final Office Action", U.S. Appl. No. 15/166,198, dated Sep. 27, 2018, 33 pages.
"Non-Final Office Action", U.S. Appl. No. 15/287,253, dated Sep. 7, 2018, 20 pages.
"Non-Final Office Action", U.S. Appl. No. 14/959,901, dated Oct. 11, 2018, 22 pages.
"Non-Final Office Action", U.S. Appl. No. 15/287,308, dated Oct. 15, 2018, 18 pages.
"Non-Final Office Action", U.S. Appl. No. 15/286,152, dated Oct. 19, 2018, 27 pages.
"Non-Final Office Action", U.S. Appl. No. 14/504,139, dated Oct. 5, 2018, 16 pages.
"Non-Final Office Action", U.S. Appl. No. 15/142,829, dated Aug. 16, 2018, 15 pages.
"Notice of Allowance", U.S. Appl. No. 14/874,955, dated Oct. 4, 2018, 8 pages.
"Notice of Allowance", U.S. Appl. No. 15/595,649, 9/14, 2018, 8 pages.
"Pre-Interview Communication", U.S. Appl. No. 15/286,495, dated Sep. 10, 2018, 4 pages.
"Restriction Requirement", U.S. Appl. No. 15/286,537, dated Aug. 27, 2018, 8 pages.
"Written Opinion", PCT Application No. PCT/US2017/051663, dated Oct. 12, 2018, 8 pages.
Gürbüz, et al., "Detection and Identification of Human Targets in Radar Data", Proc. SPIE 6567, Signal Processing, Sensor Fusion, and Target Recognition XVI, 656701, May 7, 2007, 12 pages.

\* cited by examiner

ATTACHING ELECTRONIC COMPONENTS TO INTERACTIVE TEXTILES

PRIORITY APPLICATION

This application is a divisional of and claims priority to U.S. patent application Ser. No. 14/930,220, titled "Attaching Electronic Components to Interactive Textiles", and filed on Nov. 2, 2015, which is a non-provisional of and claims priority under 35 U.S.C. § 119(e) to U.S. Patent Application Ser. No. 62/167,168, titled "Attaching Electronic Components to Interactive Textiles," and filed on May 27, 2015, the disclosure of which is incorporated by reference herein in its entirety.

BACKGROUND

Currently, producing touch sensors can be complicated and expensive, especially if the touch sensor is intended to be light, flexible, or adaptive to various different kinds of use. Conventional touch pads, for example, are generally non-flexible and relatively costly to produce and to integrate into objects.

SUMMARY

This document describes techniques and apparatuses for attaching electronic components to interactive textiles. An interactive textile includes conductive thread woven into the interactive textile to form a capacitive touch sensor that is configured to detect touch-input. The interactive textile can process the touch-input to generate touch data that is useable to initiate functionality at various remote devices that are wirelessly coupled to the interactive textile. For example, the interactive textile may aid users in controlling volume on a stereo, pausing a movie playing on a television, or selecting a webpage on a desktop computer. Due to the flexibility of textiles, the interactive textile may be easily integrated within flexible objects, such as clothing, handbags, fabric casings, hats, and so forth.

In various implementations, an interactive textile that includes conductive thread woven into the interactive textile is received. The conductive thread includes a conductive wire (e.g., a copper wire) that that is twisted, braided, or wrapped with one or more flexible threads (e.g., polyester or cotton threads). A fabric stripping process is applied to the interactive textile to strip away fabric of the interactive textile and the flexible threads to open up a window in the interactive textile in which the conductive wire is exposed.

In some implementations, the fabric stripping process applies a laser beam to the interactive textile to ablate the fabric of the interactive textile and the flexible threads in the window of the interactive textile. An absorption of the laser is low to cause the laser beam to ablate the fabric of the interactive textile and the flexible threads without ablating the conductive wire. Alternately, the fabric stripping process may apply a heating element to the interactive textile to burn or melt the fabric of the interactive textile and the flexible threads in the window of the interactive textile. In this case, a temperature of the heating element is configured to melt or burn the fabric of the interactive textile and the flexible thread without melting or burning the conductive wire.

After exposing the conductive wires in the window of the interactive textile, an electronic component (e.g., a flexible circuit board) is attached to the exposed conductive wire of the conductive thread in the window of the interactive textile. To do so, electronic plates of the electronic component are aligned with the exposed conductive wire, and heat is applied to cause the electronic plates of the electronic component to connect to the exposed conductive wire.

This summary is provided to introduce simplified concepts concerning attaching electronic components to interactive textiles, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for gest attaching electronic components to interactive textiles are described with reference to the following drawings. The same numbers are used throughout the drawings to reference like features and components.

DETAILED DESCRIPTION

Overview

Figure 1:
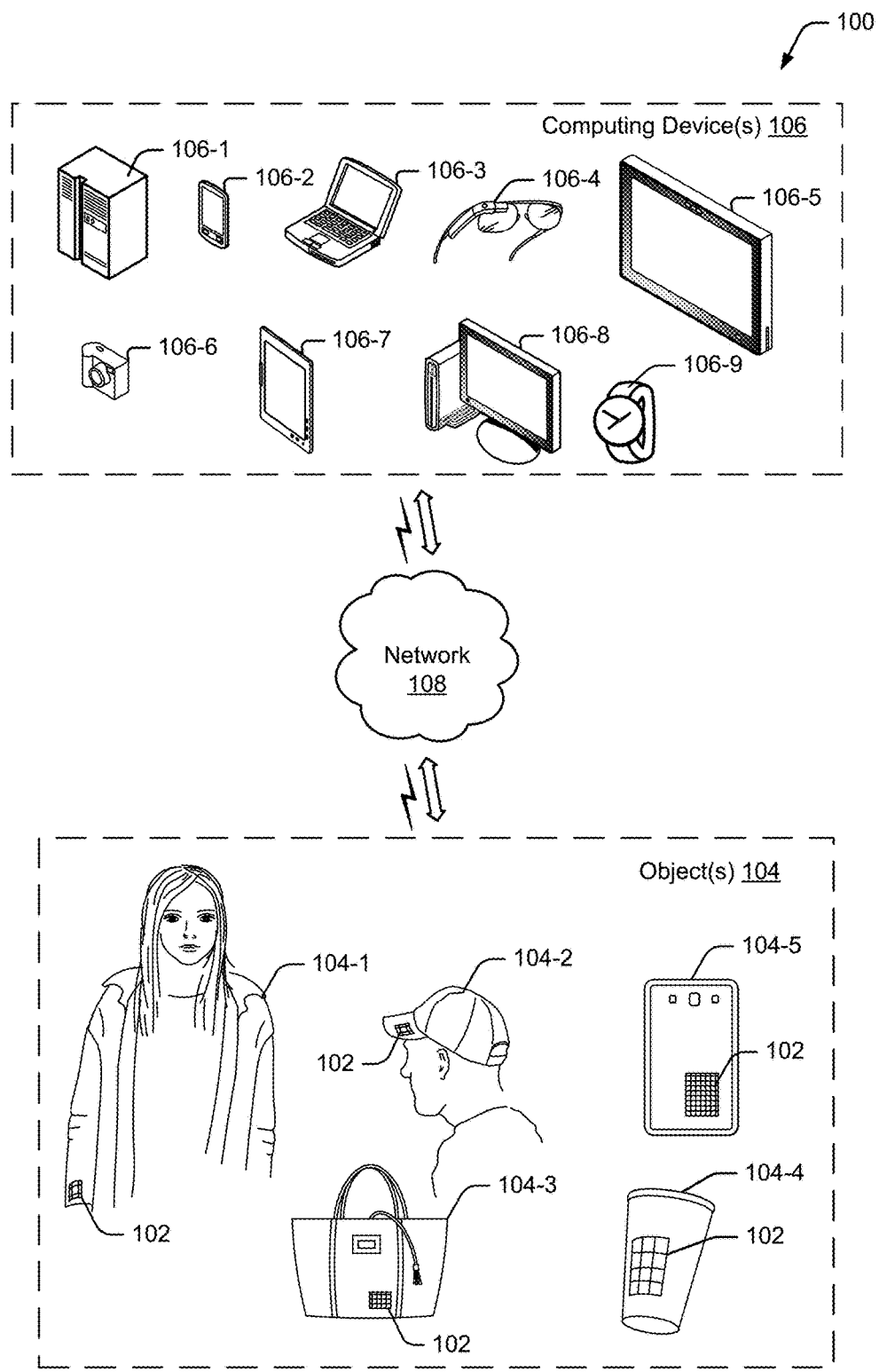
FIG. 1 is an illustration of an example environment in which techniques using, and an objects including, an interactive textile may be embodied.

An interactive textile includes conductive thread woven into the interactive textile to form a capacitive touch sensor that is configured to detect touch-input. The interactive textile can process the touch-input to generate touch data that is useable to initiate functionality at various remote devices that are wirelessly coupled to the interactive textile. For example, the interactive textile may aid users in controlling volume on a stereo, pausing a movie playing on a television, or selecting a webpage on a desktop computer. Due to the flexibility of textiles, the interactive textile may be easily integrated within flexible objects, such as clothing, handbags, fabric casings, hats, and so forth.

In order to sense multi-touch input the conductive thread must be connected to electronic components, such as flexible circuit boards. One possible approach is to specially make the interactive textiles with loose conductive threads, known as "floats", extending from the fabric. At the end of the textile manufacturing process, the electronic components can then be connected to the floats. However, this method of connecting the electronic components requires the manufacturer to design products precisely, keeping in mind where the floats will connect to the electronics. Designers and manufacturers would like to be able to design and manufacture interactive textiles without concern as to where the electronic components are to be connected to the textiles.

In various implementations, a fabric stripping process is applied to an interactive textile to enable electronic components to be attached to conductive threads that are fully woven into interactive textile 102. An interactive textile that includes conductive thread woven into the interactive textile is received. The conductive thread includes a conductive wire (e.g., a copper wire) that that is twisted, braided, or wrapped with one or more flexible threads (e.g., polyester or cotton threads). A fabric stripping process is applied to the interactive textile to strip away fabric of the interactive textile and the flexible threads to open up a window in the interactive textile in which the conductive wire is exposed.

In some implementations, the fabric stripping process applies a laser beam to the interactive textile to ablate the fabric of the interactive textile and the flexible threads in the window of the interactive textile. An absorption of the laser is low to cause the laser beam to ablate the fabric of the interactive textile and the flexible threads without ablating the conductive wire. Alternately, the fabric stripping process may apply a heating element to the interactive textile to burn or melt the fabric of the interactive textile and the flexible threads in the window of the interactive textile. In this case, a temperature of the heating element is configured to melt or burn the fabric of the interactive textile and the flexible thread without melting or burning the conductive wire.

After exposing the conductive wires in the window of the interactive textile, an electronic component (e.g., a flexible circuit board) is attached to the exposed conductive wire of the conductive thread in the window of the interactive textile. To do so, electronic plates of the electronic component are aligned with the exposed conductive wire, and heat is applied to cause the electronic plates of the electronic component to connect to the exposed conductive wire.

Notably, the described techniques enable interactive textiles to be made in a more standard way without concern for designing different sizes or products so that the electronic components can be connected in a certain area of the textile. Doing so frees designers of interactive textiles to create the interactive textiles and then to go in and attach electronic components wherever they need them, instead of designing the textile layout with a specific connection point in mind.

Example Environment

FIG. 1 is an illustration of an example environment 100 in which techniques using, and objects including, an interactive textile may be embodied. Environment 100 includes an interactive textile 102, which is shown as being integrated within various objects 104. Interactive textile 102 is a textile that is configured to sense multi-touch input. As described herein, a textile corresponds to any type of flexible woven material consisting of a network of natural or artificial fibers, often referred to as thread or yarn. Textiles may be formed by weaving, knitting, crocheting, knotting, or pressing threads together.

In environment 100, objects 104 include "flexible" objects, such as a shirt 104-1, a hat 104-2, and a handbag 104-3. It is to be noted, however, that interactive textile 102 may be integrated within any type of flexible object made from fabric or a similar flexible material, such as articles of clothing, blankets, shower curtains, towels, sheets, bed spreads, or fabric casings of furniture, to name just a few. Interactive textile 102 may be integrated within flexible objects 104 in a variety of different ways, including weaving, sewing, gluing, and so forth.

In this example, objects 104 further include "hard" objects, such as a plastic cup 104-4 and a hard smart phone casing 104-5. It is to be noted, however, that hard objects 104 may include any type of "hard" or "rigid" object made from non-flexible or semi-flexible materials, such as plastic, metal, aluminum, and so on. For example, hard objects 104 may also include plastic chairs, water bottles, plastic balls, or car parts, to name just a few. Interactive textile 102 may be integrated within hard objects 104 using a variety of different manufacturing processes. In one or more implementations, injection molding is used to integrate interactive textiles 102 into hard objects 104.

Interactive textile 102 enables a user to control object 104 that the interactive textile 102 is integrated with, or to control a variety of other computing devices 106 via a network 108. Computing devices 106 are illustrated with various non-limiting example devices: server 106-1, smart phone 106-2, laptop 106-3, computing spectacles 106-4, television 106-5, camera 106-6, tablet 106-7, desktop 106-8, and smart watch 106-9, though other devices may also be used, such as home automation and control systems, sound or entertainment systems, home appliances, security systems, netbooks, and e-readers. Note that computing device 106 can be wearable (e.g., computing spectacles and smart watches), non-wearable but mobile (e.g., laptops and tablets), or relatively immobile (e.g., desktops and servers).

Network 108 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Interactive textile 102 can interact with computing devices 106 by transmitting touch data through network 108. Computing device 106 uses the touch data to control computing device 106 or applications at computing device 106. As an example, consider that interactive textile 102 integrated at shirt 104-1 may be configured to control the user's smart phone 106-2 in the user's pocket, television 106-5 in the user's home, smart watch 106-9 on the user's wrist, or various other appliances in the user's house, such as thermostats, lights, music, and so forth. For example, the user may be able to swipe up or down on interactive textile 102 integrated within the user's shirt 104-1 to cause the volume on television 106-5 to go up or down, to cause the temperature controlled by a thermostat in the user's house to increase or decrease, or to turn on and off lights in the user's house. Note that any type of touch, tap, swipe, hold, or stroke gesture may be recognized by interactive textile 102.

Figure 2:
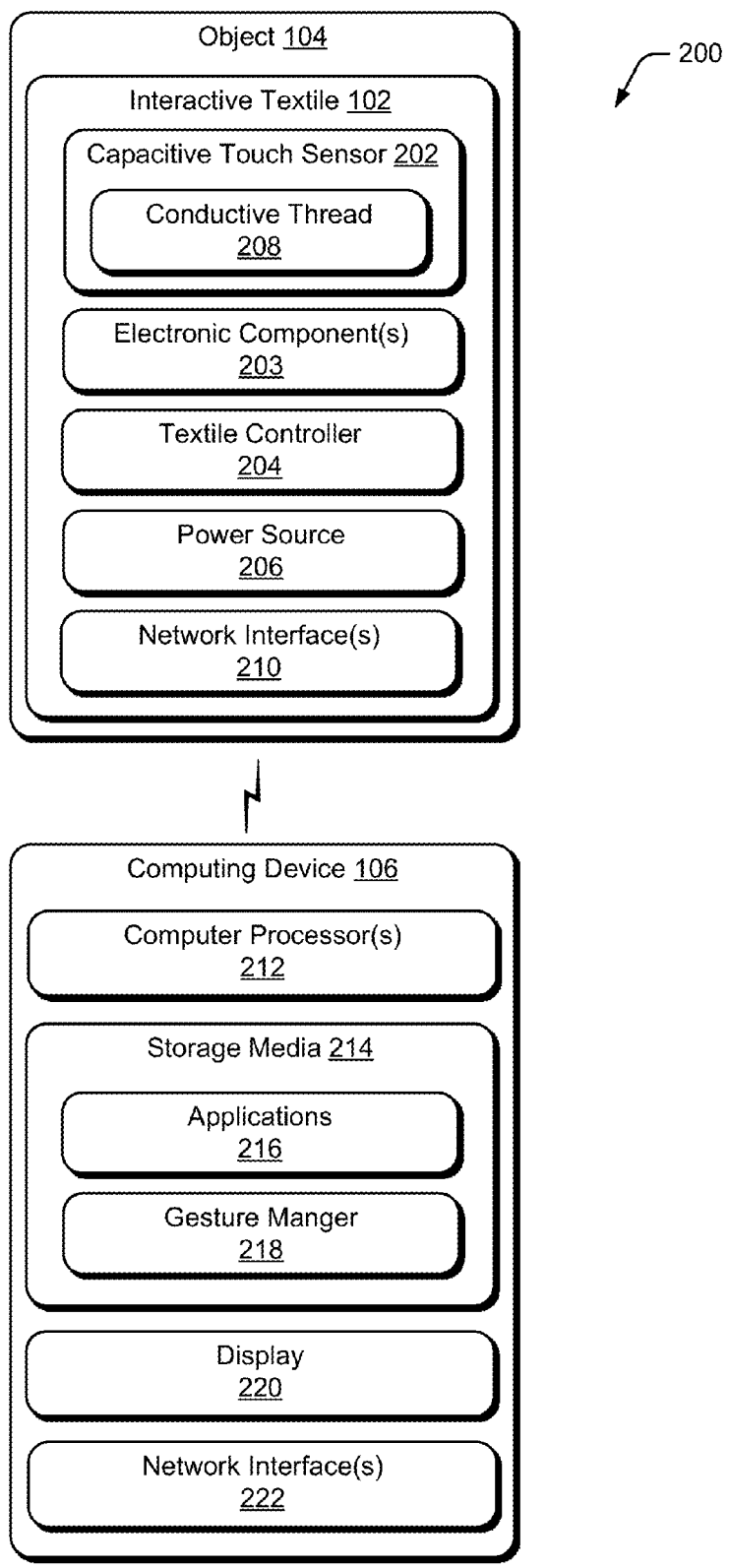
FIG. 2 illustrates an example system that includes an interactive textile and a gesture manager.

In more detail, consider FIG. 2 which illustrates an example system 200 that includes an interactive textile and a gesture manager. In system 200, interactive textile 102 is integrated in an object 104, which may be implemented as a flexible object (e.g., shirt 104-1, hat 104-2, or handbag 104-3) or a hard object (e.g., plastic cup 104-4 or smart phone casing 104-5).

Interactive textile 102 is configured to sense multi-touch-input from a user when one or more fingers of the user's hand touch interactive textile 102. Interactive textile 102 may also be configured to sense full-hand touch input from a user, such as when an entire hand of the user touches or swipes interactive textile 102. To enable this, interactive textile 102 includes a capacitive touch sensor 202 that is coupled to one or more electronic components 203, such as flexible circuit boards, sensors, heating elements, and so forth. In some cases, electronic component 203 may include a textile controller 204 and a power source 206.

Capacitive touch sensor 202 is configured to sense touch-input when an object, such as a user's finger, hand, or a conductive stylus, approaches or makes contact with capacitive touch sensor 202. Unlike conventional hard touch pads, capacitive touch sensor 202 uses a conductive thread 208 woven into interactive textile 102 to sense touch-input. Thus, capacitive touch sensor 202 does not alter the flexibility of interactive textile 102, which enables interactive textile 102 to be easily integrated within objects 104.

Power source 206 is coupled to textile controller 204 to provide power to textile controller 204, and may be implemented as a small battery. Textile controller 204 is coupled to capacitive touch sensor 202. For example, wires from the conductive threads 208 may be connected to textile controller 204 using flexible PCB, creping, gluing with conductive glue, soldering, and so forth.

In one or more implementations, electronic components 203 may also include one or more output devices, such as light sources (e.g., LED's), displays, or speakers. In this case, the output devices may also be connected to textile controller 204 to enable textile controller 204 to control their output.

Textile controller 204 is implemented with circuitry that is configured to detect the location of the touch-input on conductive thread 208, as well as motion of the touch-input. When an object, such as a user's finger, touches capacitive touch sensor 202, the position of the touch can be determined by controller 204 by detecting a change in capacitance on the grid of conductive thread 208. Textile controller 204 uses the touch-input to generate touch data usable to control computing device 102. For example, the touch-input can be used to determine various gestures, such as single-finger touches (e.g., touches, taps, and holds), multi-finger touches (e.g., two-finger touches, two-finger taps, two-finger holds, and pinches), single-finger and multi-finger swipes (e.g., swipe up, swipe down, swipe left, swipe right), and full-hand interactions (e.g., touching the textile with a user's entire hand, covering textile with the user's entire hand, pressing the textile with the user's entire hand, palm touches, and rolling, twisting, or rotating the user's hand while touching the textile). Capacitive touch sensor 202 may be implemented as a self-capacitance sensor, or a projective capacitance sensor, which is discussed in more detail below.

Object 104 may also include network interfaces 210 for communicating data, such as touch data, over wired, wireless, or optical networks to computing devices 106. By way of example and not limitation, network interfaces 210 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like (e.g., through network 108 of FIG. 1).

In this example, computing device 106 includes one or more computer processors 212 and computer-readable storage media (storage media) 214. Storage media 214 includes applications 216 and/or an operating system (not shown) embodied as computer-readable instructions executable by computer processors 212 to provide, in some cases, functionalities described herein. Storage media 214 also includes a gesture manager 218 (described below).

Computing device 106 may also include a display 220 and network interfaces 222 for communicating data over wired, wireless, or optical networks. For example, network interfaces 222 can receive touch data sensed by interactive textile 102 from network interfaces 210 of object 104. By way of example and not limitation, network interface 222 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like.

Gesture manager 218 is capable of interacting with applications 216 and interactive textile 102 effective to activate various functionalities associated with computing device 106 and/or applications 216 through touch-input (e.g., gestures) received by interactive textile 102. Gesture manager 218 may be implemented at a computing device 106 that is local to object 104, or remote from object 104.

Having discussed a system in which interactive textile 102 can be implemented, now consider a more-detailed discussion of interactive textile 102.

Figure 3:
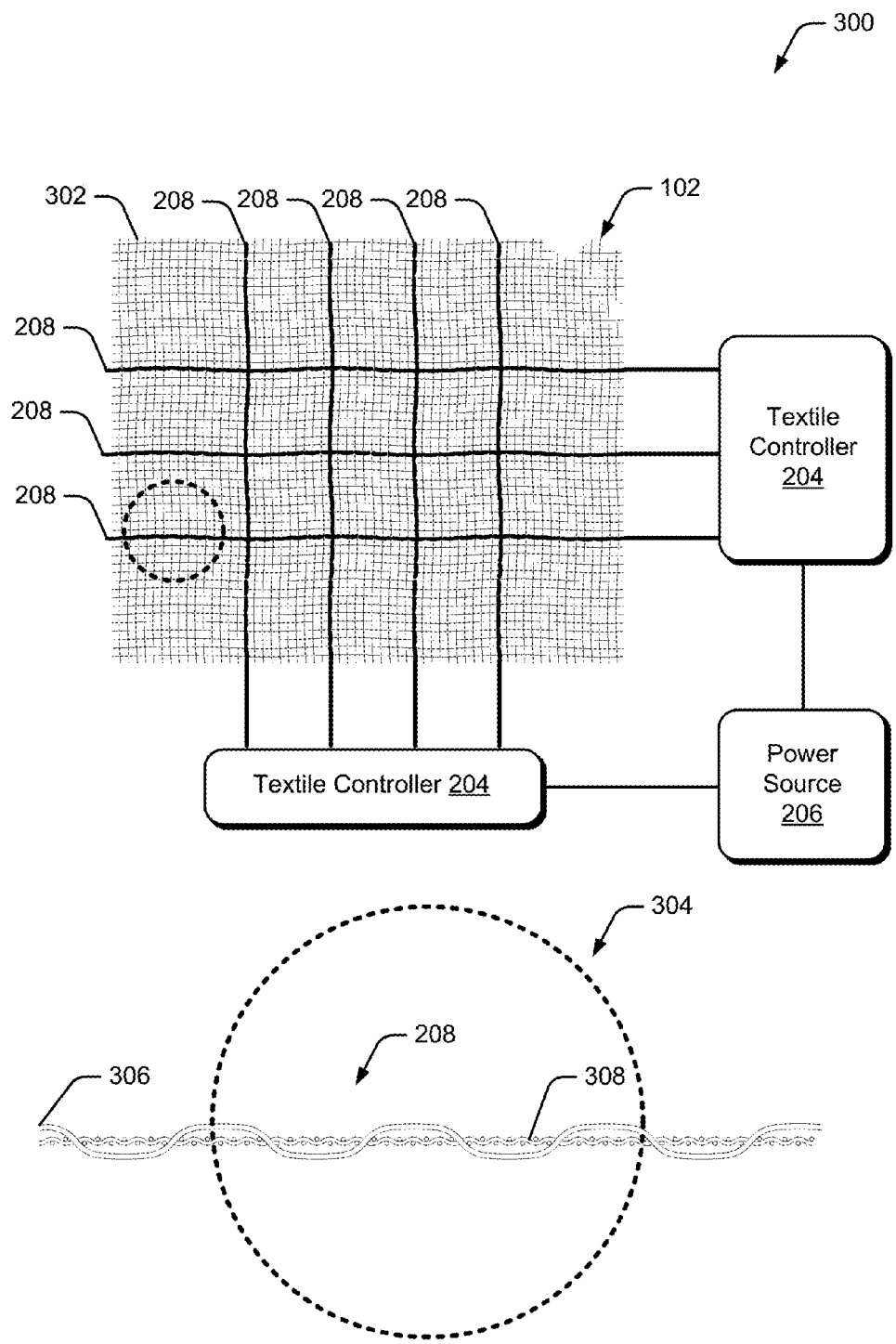
FIG. 3 illustrates an example of an interactive textile in accordance with one or more implementations.

FIG. 3 illustrates an example 300 of interactive textile 102 in accordance with one or more implementations. In this example, interactive textile 102 includes non-conductive threads 302 woven with conductive threads 208 to form interactive textile 102. Non-conductive threads 302 may correspond to any type of non-conductive thread, fiber, or fabric, such as cotton, wool, silk, nylon, polyester, and so forth.

At 304, a zoomed-in view of conductive thread 208 is illustrated. Conductive thread 208 includes a conductive wire 306 that is twisted, braided, or wrapped with a flexible thread 308. Twisting conductive wire 306 with flexible thread 308 causes conductive thread 208 to be flexible and stretchy, which enables conductive thread 208 to be easily woven with non-conductive threads 302 to form interactive textile 102.

In one or more implementations, conductive wire 306 is a thin copper wire. It is to be noted, however, that conductive wire 306 may also be implemented using other materials, such as silver, gold, or other materials coated with a conductive polymer. Flexible thread 308 may be implemented as any type of flexible thread or fiber, such as cotton, wool, silk, nylon, polyester, and so forth.

In one or more implementations, conductive thread 208 includes a conductive core that includes at least one conductive wire 306 (e.g., one or more copper wires) and a cover layer, configured to cover the conductive core, that is constructed from flexible threads 308. In some cases, conductive wire 306 of the conductive core is insulated. Alternately, conductive wire 306 of the conductive core is not insulated.

In one or more implementations, the conductive core may be implemented using a single, straight, conductive wire 306. Alternately, the conductive core may be implemented using a conductive wire 306 and one or more flexible threads 308. For example, the conductive core may be formed by twisting one or more flexible threads 308 (e.g., silk threads, polyester threads, or cotton threads) with conductive wire 306 (e.g., as shown at 304 of FIG. 3), or by wrapping flexible threads 308 around conductive wire 306.

In one or more implementations, the conductive core includes flexible threads 308 braided with conductive wire 306. A variety of different types of flexible threads 308 may be utilized to braid with conductive wire 306, such as polyester or cotton, in order to form the conductive core. In one or more implementations, however, silk threads are used for the braided construction of the conductive core. Silk threads are slightly twisted which enables the silk threads to "grip" or hold on to conductive wire 306. Thus, using silk threads may increase the speed at which the braided conductive core can be manufactured. In contrast, a flexible thread like polyester is slippery, and thus does not "grip" the conductive wire as well as silk. Thus, a slippery thread is more difficult to braid with the conductive wire, which may slow down the manufacturing process.

An additional benefit of using silk threads to create the braided conductive core is that silk is both thin and strong, which enables the manufacture of a thin conductive core that will not break during the interaction textile weaving process. A thin conductive core is beneficial because it enables the manufacturer to create whatever thickness they want for conductive thread 208 (e.g., thick or thin) when covering the conductive core with the second layer.

After forming the conductive core, a cover layer is constructed to cover the conductive core. In one or more implementations, the cover layer is constructed by wrapping flexible threads (e.g., polyester threads, cotton threads, wool threads, or silk threads) around the conductive core. For example, the cover layer may be formed by wrapping polyester threads around the conductive core at approximately 1900 turns per yard.

In one or more implementations, the cover layer includes flexible threads braided around the conductive core. The braided cover layer may be formed using the same type of braiding as described above. Any type of flexible thread 308 may be used for the braided cover layer. The thickness of the flexible thread and the number of flexible threads that are braided around the conductive core can be selected based on the desired thickness of conductive thread 208. For example, if conductive thread 208 is intended to be used for denim, a thicker flexible thread (e.g., cotton) and/or a greater number of flexible threads may be used to form the cover layer.

In one or more implementations, conductive thread 208 is constructed with a "double-braided" structure. In this case, the conductive core is formed by braiding flexible threads, such as silk, with a conductive wire (e.g., copper), as described above. Then, the cover layer is formed by braiding flexible threads (e.g., silk, cotton, or polyester) around the braided conductive core. The double-braided structure is strong, and thus is unlikely to break when being pulled during the weaving process. For example, when the double-braided conductive thread is pulled, the braided structure contracts and forces the braided core of copper to contract also with makes the whole structure stronger. Further, the double-braided structure is soft and looks like normal yarn, as opposed to a cable, which is important for aesthetics and feel.

Interactive textile 102 can be formed cheaply and efficiently, using any conventional weaving process (e.g., jacquard weaving or 3D-weaving), which involves interlacing a set of longer threads (called the warp) with a set of crossing threads (called the weft). Weaving may be implemented on a frame or machine known as a loom, of which there are a number of types. Thus, a loom can weave non-conductive threads 302 with conductive threads 208 to create interactive textile 102.

In example 300, conductive thread 208 is woven into interactive textile 102 to form a grid that includes a set of substantially parallel conductive threads 208 and a second set of substantially parallel conductive threads 208 that crosses the first set of conductive threads to form the grid. In this example, the first set of conductive threads 208 are oriented horizontally and the second set of conductive threads 208 are oriented vertically, such that the first set of conductive threads 208 are positioned substantially orthogonal to the second set of conductive threads 208. It is to be appreciated, however, that conductive threads 208 may be oriented such that crossing conductive threads 208 are not orthogonal to each other. For example, in some cases crossing conductive threads 208 may form a diamond-shaped grid. While conductive threads 208 are illustrated as being spaced out from each other in FIG. 3, it is to be noted that conductive threads 208 may be weaved very closely together. For example, in some cases two or three conductive threads may be weaved closely together in each direction. Further, in some cases the conductive threads may be oriented as parallel sensing lines that do not cross or intersect with each other.

Conductive wire 306 may be insulated to prevent direct contact between crossing conductive threads 208. To do so, conductive wire 306 may be coated with a material such as enamel or nylon. Alternately, rather than insulating conductive wire 306, interactive textile may be generated with three separate textile layers to ensure that crossing conductive threads 208 do not make direct contact with each other. The three textile layers may be combined (e.g., by sewing or gluing the layers together) to form interactive textile 102. In this example, a first textile layer may include horizontal conductive threads 208 and a second textile layer may includes vertical conductive threads 208. A third textile layer, that does not include any conductive threads, may be positioned between the first and second textile layers to prevent vertical conductive threads from making direct contact with horizontal conductive threads 208.

In one or more implementations, interactive textile 102 includes a top textile layer and a bottom textile layer. The top textile layer includes conductive threads 208 woven into the top textile layer, and the bottom textile layer also includes conductive threads woven into the bottom textile layer. When the top textile layer is combined with the bottom textile layer, the conductive threads from each layer form capacitive touch sensor 202. The top textile layer and the bottom textile layer may be combined in a variety of different ways, such as by weaving, sewing, or gluing the layers together to form interactive textile 102. In one or more implementations, the top and bottom textile layers are combined using a jacquard weaving process or any type of 3D-weaving process. When the top and bottom textile layers are combined, the conductive threads of the top layer couple to the conductive threads of the bottom layer to form capacitive touch sensor 202, as described above.

During operation, capacitive touch sensor 202 may be configured to determine positions of touch-input on the grid of conductive thread 208 using self-capacitance sensing or projective capacitive sensing.

When configured as a self-capacitance sensor, textile controller 204 charges crossing conductive threads 208 (e.g., horizontal and vertical conductive threads) by applying a control signal (e.g., a sine signal) to each conductive thread 208. When an object, such as the user's finger, touches the grid of conductive thread 208, the conductive threads 208 that are touched are grounded, which changes the capacitance (e.g., increases or decreases the capacitance) on the touched conductive threads 208.

Textile controller 204 uses the change in capacitance to identify the presence of the object. To do so, textile controller 204 detects a position of the touch-input by detecting which horizontal conductive thread 208 is touched, and which vertical conductive thread 208 is touched by detecting changes in capacitance of each respective conductive thread 208. Textile controller 204 uses the intersection of the crossing conductive threads 208 that are touched to determine the position of the touch-input on capacitive touch sensor 202. For example, textile controller 204 can determine touch data by determining the position of each touch as X,Y coordinates on the grid of conductive thread 208.

When implemented as a self-capacitance sensor, "ghosting" may occur when multi-touch input is received. Consider, for example, that a user touches the grid of conductive thread 208 with two fingers. When this occurs, textile controller 204 determines X and Y coordinates for each of the two touches. However, textile controller 204 may be unable to determine how to match each X coordinate to its corresponding Y coordinate. For example, if a first touch has the coordinates X1, Y1 and a second touch has the coordinates X4, Y4, textile controller 204 may also detect "ghost" coordinates X1, Y4 and X4, Y1.

In one or more implementations, textile controller 204 is configured to detect "areas" of touch-input corresponding to two or more touch-input points on the grid of conductive thread 208. Conductive threads 208 may be weaved closely together such that when an object touches the grid of conductive thread 208, the capacitance will be changed for multiple horizontal conductive threads 208 and/or multiple vertical conductive threads 208. For example, a single touch with a single finger may generate the coordinates X1, Y1 and X2, Y1. Thus, textile controller 204 may be configured to detect touch-input if the capacitance is changed for multiple horizontal conductive threads 208 and/or multiple vertical conductive threads 208. Note that this removes the effect of ghosting because textile controller 204 will not detect touch-input if two single-point touches are detected which are spaced apart.

Alternately, when implemented as a projective capacitance sensor, textile controller 204 charges a single set of conductive threads 208 (e.g., horizontal conductive threads 208) by applying a control signal (e.g., a sine signal) to the single set of conductive threads 208. Then, textile controller 204 senses changes in capacitance in the other set of conductive threads 208 (e.g., vertical conductive threads 208).

In this implementation, vertical conductive threads 208 are not charged and thus act as a virtual ground. However, when horizontal conductive threads 208 are charged, the horizontal conductive threads capacitively couple to vertical conductive threads 208. Thus, when an object, such as the user's finger, touches the grid of conductive thread 208, the capacitance changes on the vertical conductive threads (e.g., increases or decreases). Textile controller 204 uses the change in capacitance on vertical conductive threads 208 to identify the presence of the object. To do so, textile controller 204 detects a position of the touch-input by scanning vertical conductive threads 208 to detect changes in capacitance. Textile controller 204 determines the position of the touch-input as the intersection point between the vertical conductive thread 208 with the changed capacitance, and the horizontal conductive thread 208 on which the control signal was transmitted. For example, textile controller 204 can determine touch data by determining the position of each touch as X,Y coordinates on the grid of conductive thread 208.

Whether implemented as a self-capacitance sensor or a projective capacitance sensor, capacitive sensor 208 is configured to communicate the touch data to gesture manager 218 to enable gesture manager 218 to determine gestures based on the touch data, which can be used to control object 104, computing device 106, or applications 216 at computing device 106.

Gesture manager 218 can be implemented to recognize a variety of different types of gestures, such as touches, taps, swipes, holds, and covers made to interactive textile 102. To recognize the various different types of gestures, gesture manager 218 is configured to determine a duration of the touch, swipe, or hold (e.g., one second or two seconds), a number of the touches, swipes, or holds (e.g., a single tap, a double tap, or a triple tap), a number of fingers of the touch, swipe, or hold (e.g., a one finger-touch or swipe, a two-finger touch or swipe, or a three-finger touch or swipe), a frequency of the touch, and a dynamic direction of a touch or swipe (e.g., up, down, left, right). With regards to holds, gesture manager 218 can also determine an area of capacitive touch sensor 202 of interactive textile 102 that is being held (e.g., top, bottom, left, right, or top and bottom. Thus, gesture manager 218 can recognize a variety of different types of holds, such as a cover, a cover and hold, a five finger hold, a five finger cover and hold, a three finger pinch and hold, and so forth.

Attaching Electronic Components to Interactive Textiles

In order to sense multi-touch input, conductive threads 208 must be connected to electronic components 203, such as flexible circuit boards. When conductive thread 208 is woven into interactive textile 102, however, the conductive wire 306 may not be visible and cannot be accessed because they are wrapped with flexible threads 308 and woven into the fabric of the textile. In the past, therefore, the interactive textiles were specially made to have loose conductive threads, known as "floats", extending from the fabric. At the end of the textile manufacturing process, the electronic components could then be connected to the floats. However, this method of connecting the electronic components required the manufacturer to design products precisely, keeping in mind where the floats would connect to the electronics. Designers and manufacturers would like to be able to design and manufacture interactive textiles without concern as to where the electronic components are to be connected to the textiles.

In various implementations, a fabric stripping process is applied to interactive textile 102 to enable electronic components 203 to be attached to conductive threads 208 that are fully woven into interactive textile 102. Consider, for example, FIG. 4 which illustrates an example environment 400 in which a fabric stripping process to expose conductive wires of an interactive textile may be implemented.

Environment 400 includes a fabric stripping component 402, which may include a laser 404 and/or a heating element 406. Fabric stripping component 402 is configured to strip away the fabric of interactive textile 102 around conductive threads 208, and to strip away flexible threads 308 of conductive threads 208 without removing the conductive wires 306. Thus, at the end of the fabric stripping process, a window 408 is opened in the interactive textile in which conductive wires 306 are exposed. Note that in window 408, the fabric of interactive textile 102 and flexible thread 308 of conductive thread 208 is removed, and all that remains is exposed conductive wire 306. In this example, the exposed conductive wires 306 are shown as parallel lines, however, the exposed wires could also be a grid, or another type of pattern such as a diamond.

In one or more implementations, fabric stripping component 402 uses a laser ablation process to expose conductive wires 306 in window 408 of interactive textile 102. Laser ablation is the process of removing material by irradiating it with a laser beam. At low laser flux, the material is heated by the absorbed laser energy and evaporates or sublimates. At high laser flux, the material is typically converted to a plasma. Laser ablation may include techniques that remove material with a pulsed laser, as well as techniques in which the material is ablated with a continuous wave laser beam if the laser intensity is high enough.

Fabric stripping component 402 can apply a focused laser beam of laser 404 to window 408 to ablate flexible threads 308 and the fabric of textile 102 in window 408 without ablating the conductive wire 306. The absorption of laser 404 is low which enables the focused laser beam to ablate the fabric of interactive textile 102 and flexible thread 308 without ablating the conductive wire 306. For example, the absorption of the laser may be configured to ablate materials such as cotton or polyester without ablating metals such as copper or silver.

Alternately, fabric stripping component 402 may use a heating process to melt or burn away the fabric of interactive textile 102 and flexible thread 308 to expose conductive wires 306 in window 408. For example, fabric stripping component 402 can apply heating element 406 to interactive textile 102 to melt or burn away the fabric of textile 102 and flexible thread 308 in window 408. A temperature of heating element 406 is configured to melt or burn the fabric of interactive textile 102 and flexible thread 308 without melting or burning conductive wire 306. In one or more implementations, heating element 406 comprises a hot bar, although other types of heating elements could also be utilized.

After exposing conductive wires 306 in window 408, an attachment process is applied to attach an electronic component 203 to the exposed conductive wires. As an example, consider FIG. 5 which illustrates an example environment 500 in which an attachment process to attach an electronic component to exposed conductive wires of an interactive textile may be implemented.

Environment 500 includes an attachment component 502, which includes a hot plate 504. Attachment component 502 is configured to attach an electronic component 203 (e.g., a flexible circuit board) to the exposed conductive wires 306 of interactive textile 102 in window 408.

Attachment component 502 receives interactive textile 102 from fabric stripping component 402 after one or more windows 408 have been opened up in the textile, and places electronic component 203 on top of the opened window 408 of interactive textile 102 so that electronic plates of electronic component 203 are aligned with the exposed conductive wires 306. In one or more implementations, the electronic plates of electronic component 203 may be prepped with solder.

In one or more implementations, attachment component 502 connects a specially prepared connection tape 506 to the exposed conductive wires 306 in window 408 of interactive textile 102. Connection tape 506 may be prepared with both electrical pads pre-tinned with solder and with heat-activated adhesive.

After electronic component 203 is placed on top of opened window 408, attachment component 502 applies heat via hot plate 504 by pressing hot plate 504 against the connection so that the solder of the connection tape, or the solder applied to the electronic plates of electronic component 203, melts and connects to the exposed conductive wires 306 of interactive textile 102. At the same time, the application of the hot plate causes a mechanical connection to be formed between the exposed conductive wire 306 and electronic component 203 via the heat-activated adhesive of connection tape 506.

Figure 4:
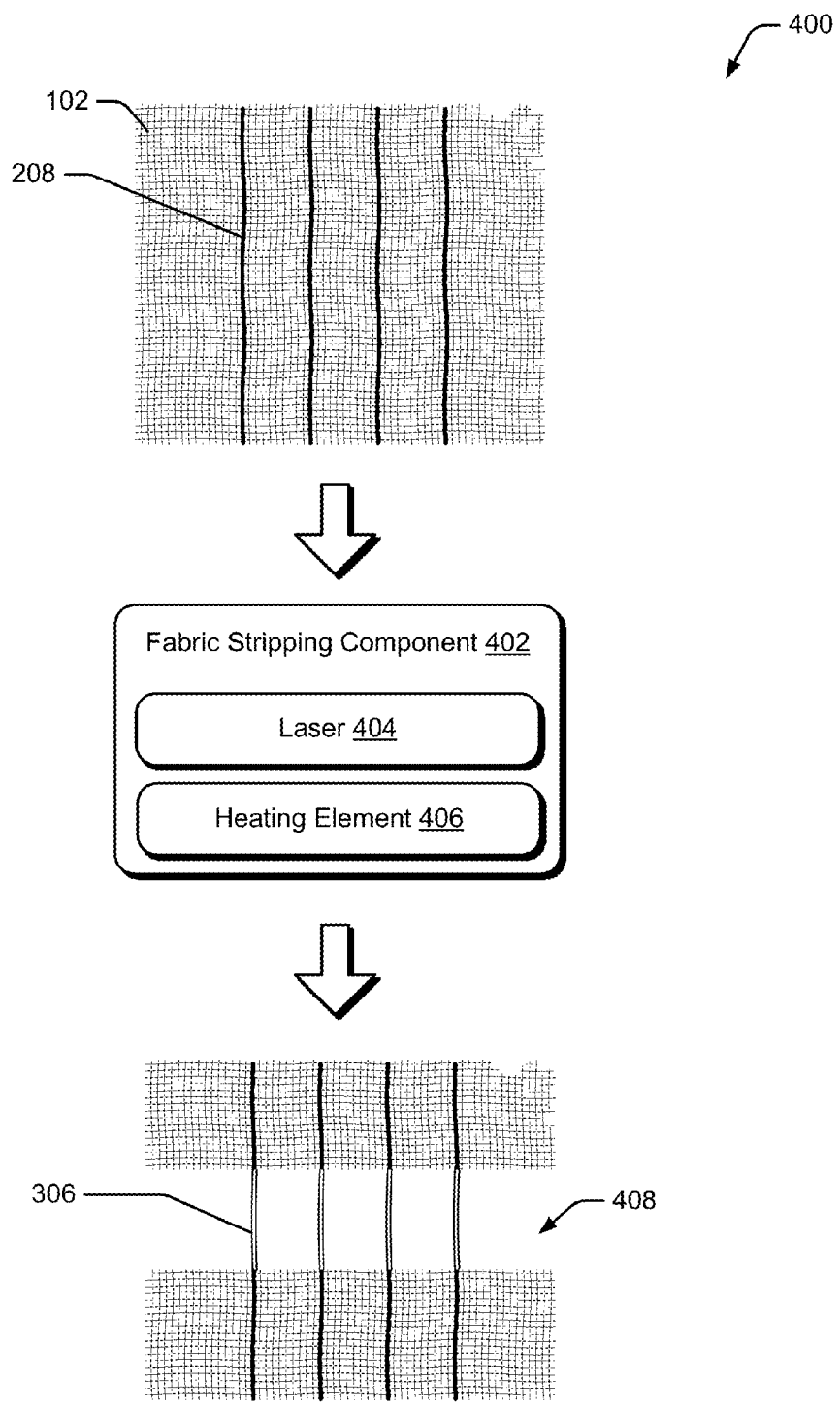
FIG. 4 illustrates an example environment in which a fabric stripping process to expose conductive wires of an interactive textile may be implemented.
Figure 5:
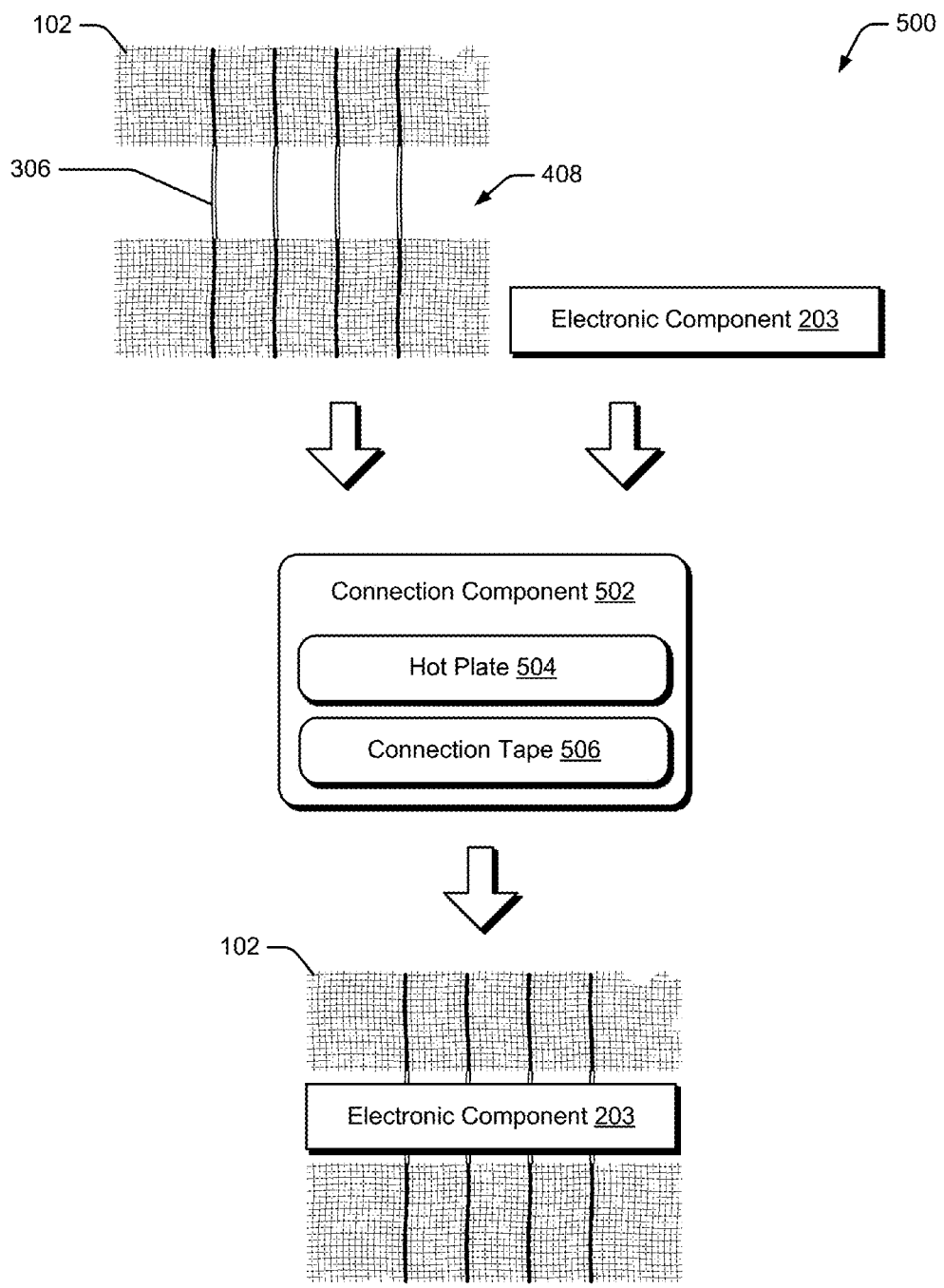
FIG. 5 which illustrates an example environment in which an attachment process to attach an electronic component to exposed conductive wires of an interactive textile may be implemented

While FIGS. 4 and 5 illustrate a single window 408, it is to be appreciated that any number of windows 408 may be opened up in interactive textile 102 to enable any number of electronic components 203 to be attached to interactive textile 102 at a variety of different positions.

Figure 6:
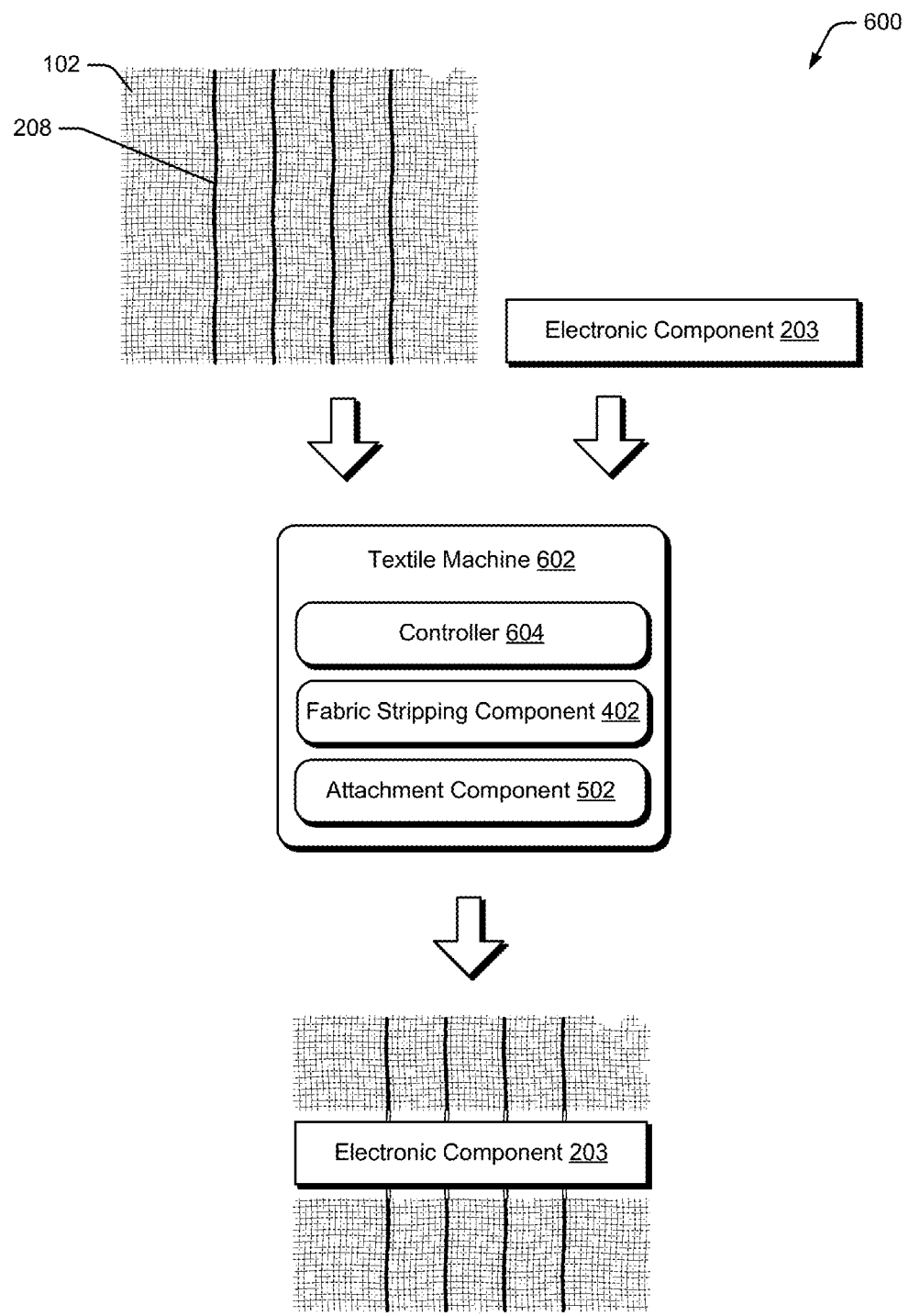
FIG. 6 illustrates an example system in which a textile machine can be implemented to attach an electronic component to an interactive textile.

In one or more implementations, the fabric stripping process and the attachment process is implemented by a machine. Consider, for example, FIG. 6 which illustrates an example system 600 in which a textile machine 602 can be implemented to attach an electronic component to interactive textile 102.

Textile machine 602 includes a controller 604 which may be implemented in computer-executable instructions, and configured to control textile machine 602 to attach electronic component 203 to interactive textile 102. Textile machine 602 further includes fabric stripping component 402 and attachment component 502.

Controller 604 is configured to control machinery of textile machine 602 to position interactive textiles 102 proximate fabric stripping component 402. Then, controller 604 controls the fabric stripping component to strip away the fabric of interactive textile 102 around conductive threads 208, and to strip away the flexible threads 308 to open up a window 408 in which the conductive wires 306 are exposed, as described with regards to FIG. 4 above. After window 408 is opened up in interactive textile 102, controller 604 controls attachment component 502 to attach electronic component 203 to the exposed wires 306 in the opened window of interactive textile 102, as described above with regards to FIG. 5.

Example Methods

Figure 7:
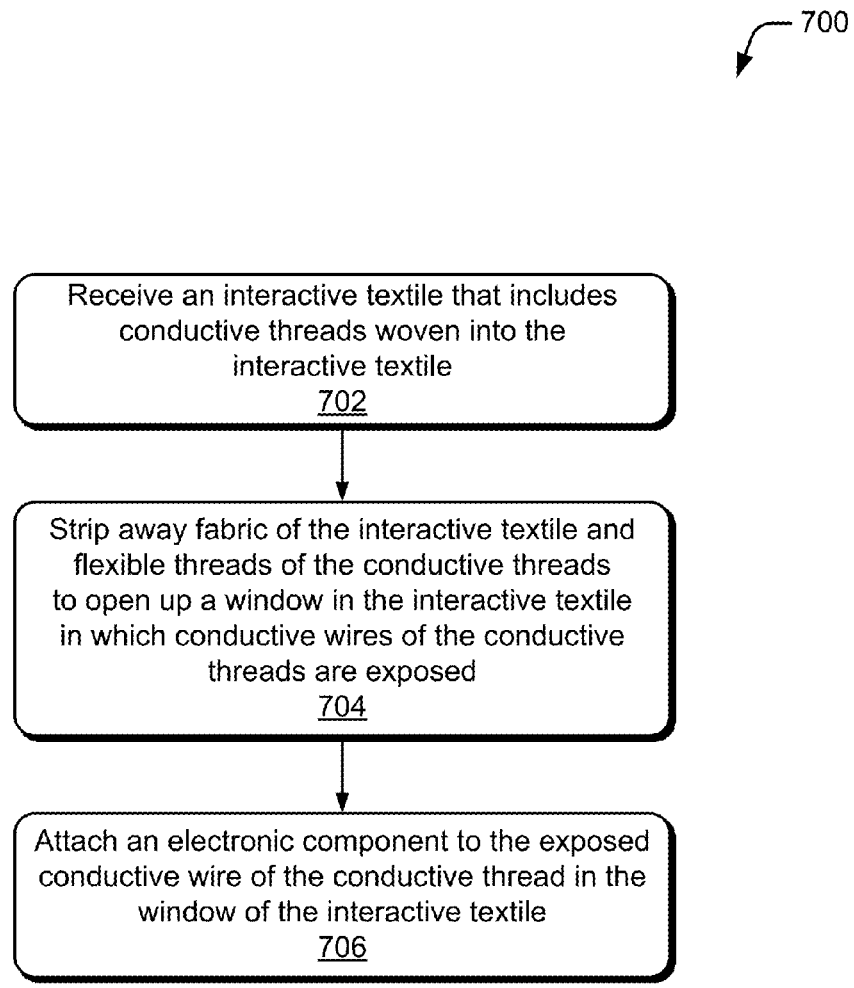
FIG. 7 illustrates an example method of attaching an electronic component to an interactive textile.

FIG. 7 illustrates an example method 700 of attaching an electronic component to an interactive textile. This method is shown as sets of blocks that specify operations performed but are not necessarily limited to the order or combinations shown for performing the operations by the respective blocks. The techniques are not limited to performance by one entity or multiple entities operating on one device.

At 702, an interactive textile that includes conductive threads woven into the interactive textile is received. For example, fabric stripping component 402 receives interactive textile 102. Interactive textile 102 includes conductive threads 208 woven into the interactive textile, where each conductive thread 208 includes a conductive wire 306 that is twisted, braided, or wrapped with one or more flexible threads 308.

At 704, fabric of the interactive textile and flexible threads of the conductive threads are stripped away to open up a window in the interactive textile in which conductive wires of the conductive threads are exposed. For example, fabric stripping component 402 strips away fabric of interactive textile 102 and flexible threads 308 of conductive threads 208 to open up window 408 in interactive textile 102 in which conductive wires 306 are exposed.

At 706, an electronic component is attached to the exposed conductive wires in the window of the interactive textile. For example, attachment component 502 attaches electronic component 203 to exposed conductive wires 306 in window 408 of interactive textile 102.

Example Computing System

Figure 8:
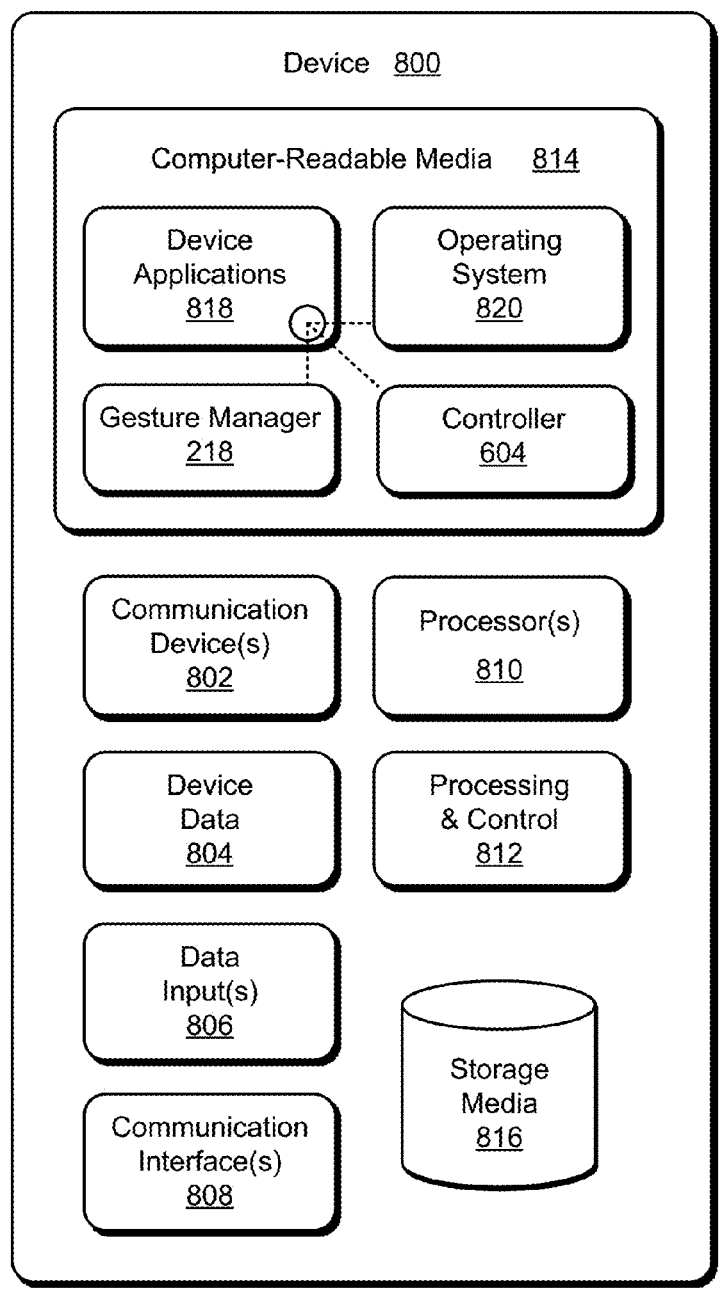
FIG. 8 illustrates various components of an example computing system that can be implemented as any type of client, server, and/or computing device as described with reference to the previous FIGS. 1-7 to implement attaching electronic components to interactive textiles.

FIG. 8 illustrates various components of an example computing system 800 that can be implemented as any type of client, server, and/or computing device as described with reference to the previous FIGS. 1-7 to implement attaching electronic components to interactive textiles. In embodiments, computing system 800 can be implemented as one or a combination of a wired and/or wireless wearable device, System-on-Chip (SoC), and/or as another type of device or portion thereof. Computing system 800 may also be associated with a user (e.g., a person) and/or an entity that operates the device such that a device describes logical devices that include users, software, firmware, and/or a combination of devices.

Computing system 800 includes communication devices 802 that enable wired and/or wireless communication of device data 804 (e.g., received data, data that is being received, data scheduled for broadcast, data packets of the data, etc.). Device data 804 or other device content can include configuration settings of the device, media content stored on the device, and/or information associated with a user of the device. Media content stored on computing system 800 can include any type of audio, video, and/or image data. Computing system 800 includes one or more data inputs 806 via which any type of data, media content, and/or inputs can be received, such as human utterances, touch data generated by interactive textile 102, user-selectable inputs (explicit or implicit), messages, music, television media content, recorded video content, and any other type of audio, video, and/or image data received from any content and/or data source.

Computing system 800 also includes communication interfaces 808, which can be implemented as any one or more of a serial and/or parallel interface, a wireless interface, any type of network interface, a modem, and as any other type of communication interface. Communication interfaces 808 provide a connection and/or communication links between computing system 800 and a communication network by which other electronic, computing, and communication devices communicate data with computing system 800.

Computing system 800 includes one or more processors 810 (e.g., any of microprocessors, controllers, and the like), which process various computer-executable instructions to control the operation of computing system 800 and to enable techniques for, or in which can be embodied, interactive textiles. Alternatively or in addition, computing system 800 can be implemented with any one or combination of hardware, firmware, or fixed logic circuitry that is implemented in connection with processing and control circuits which are generally identified at 812. Although not shown, computing system 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 800 also includes computer-readable media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 800 can also include a mass storage media device 816.

Computer-readable media 814 provides data storage mechanisms to store device data 804, as well as various device applications 818 and any other types of information and/or data related to operational aspects of computing system 800. For example, an operating system 820 can be maintained as a computer application with computer-readable media 814 and executed on processors 810. Device applications 818 may include a device manager, such as any form of a control application, software application, signal-processing and control module, code that is native to a particular device, a hardware abstraction layer for a particular device, and so on.

Device applications 818 also include any system components, engines, or managers to implement attaching electronic components to interactive textiles. In this example, device applications 818 include gesture manager 218 and controller 604.

Conclusion

Although embodiments of techniques using, and objects including, attaching electronic components to interactive textiles have been described in language specific to features and/or methods, it is to be understood that the subject of the appended claims is not necessarily limited to the specific features or methods described. Rather, the specific features and methods are disclosed as example implementations of attaching electronic components to interactive textiles.

What is claimed is:

1. A method for attaching an electronic component to an interactive textile, the method comprising:
receiving an interactive textile comprising conductive threads interwoven with a fabric of the interactive textile, each conductive thread comprising one or more flexible threads and a conductive wire;
stripping away a portion of both the fabric of the interactive textile and the flexible threads of the conductive threads of the interactive textile to open up a window in the interactive textile in which the conductive wires are exposed; and
attaching an electronic component to the exposed conductive wires of the conductive thread in the window of the interactive textile.

2. The method of claim 1, wherein the stripping away the fabric of the interactive textile and the flexible threads of the conductive threads comprises applying a laser beam to the interactive textile to ablate the fabric of the interactive textile and the flexible threads to open up the window in the interactive textile.

3. The method of claim 2, wherein an absorption of the laser is low to cause the laser beam to ablate the fabric of the interactive textile and the flexible threads without ablating the conductive wires.

4. The method of claim 1, wherein the stripping away the fabric of the interactive textile and the flexible threads of the conductive threads comprises applying a heating element to the interactive textile to burn or melt the fabric of the interactive textile and the flexible threads to open up the window in the interactive textile.

5. The method of claim 4, wherein a temperature of the heating element is configured to melt or burn the fabric of the interactive textile and the flexible thread without melting or burning the conductive wire.

6. The method of claim 4, wherein the heating element comprises a hot bar.

7. The method of claim 1, wherein the attaching the electronic component further comprises:
aligning electronic plates of the electronic component with the exposed conductive wire; and
applying heat to cause the electronic plates of the electronic component to connect to the exposed conductive wire.

8. The method of claim 7, wherein the electronic plates of the electronic component are prepped with solder, and wherein the applying heat causes the solder to melt and connect to the exposed conductive wires.

9. The method of claim 7, further comprising:
connecting connection tape to the exposed conductive wires in the window of the interactive textile, the connection tape configured with electrical pads pre-tinned with solder and with a heat-activated adhesive; and wherein the applying heat causes the solder to melt and connect to the exposed conductive wire and causes the heat-activated adhesive to form a mechanical connection between the exposed conductive wires and the electronic component.

10. The method of claim 1, wherein the electronic component comprises a flexible circuit board.

11. The method of claim 1, wherein the conductive wire comprises a copper wire.

12. The method of claim 1, wherein the flexible thread comprises polyester thread, cotton thread, or silk thread.

13. The method of claim 2, wherein the laser beam is computer controlled.

14. The method of claim 1, wherein the heating element is computer controlled.

15. The method of claim 1, wherein the interactive textile is configured to provide a touch-input.

16. The method of claim 15, wherein the touch input is communicated to a remote computing device via the electronic component.

17. The method of claim 1, wherein the interactive textile is part of an article of clothing or clothing accessory.

18. The method of claim 1, wherein the flexible threads encapsulate the conductive wires.

19. The method of claim 1, wherein the exposed conductive wires are parallel within the window.

20. A method for exposing conductive threads of an interactive textile for electrical connection, the method comprising:
receiving an interactive textile that includes conductive threads interwoven with non-conductive threads, each conductive thread comprising one or more flexible threads and a conductive wire; and
removing a portion of both the non-conductive threads and the flexible threads of the conductive threads within a portion of the interactive textile via a computer-controlled laser or heating element, the removal effective to open up a window in the interactive textile in which only the conductive wires remain, the exposed conductive wires enabling an electronic component to be electrically coupled thereto.

* * * * *